(12) United States Patent
Esswie et al.

(10) Patent No.: US 12,556,943 B2
(45) Date of Patent: Feb. 17, 2026

(54) ARTIFICIAL INTELLIGENCE RADIO FUNCTION MODEL MANAGEMENT IN A COMMUNICATION NETWORK

(71) Applicant: Dell Products, L.P., Round Rock, TX (US)

(72) Inventors: Ali Esswie, Montreal (CA); Gwenael Poitau, Montreal (CA); Hamidreza Farmanbar, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 535 days.

(21) Appl. No.: 18/072,347

(22) Filed: Nov. 30, 2022

(65) Prior Publication Data

US 2024/0187877 A1    Jun. 6, 2024

(51) Int. Cl.
  *H04W 24/02*    (2009.01)
  *H04W 24/08*    (2009.01)
(52) U.S. Cl.
  CPC .......... *H04W 24/02* (2013.01); *H04W 24/08* (2013.01)
(58) Field of Classification Search
  CPC ....... H04W 24/02; H04W 24/08; H04W 8/24; H04W 72/23
  See application file for complete search history.

(56) References Cited

U.S. PATENT DOCUMENTS

| | | |
|---|---|---|
| 11,580,444 B2 | 2/2023 | Franklin et al. |
| 11,924,052 B2 | 3/2024 | Shin et al. |
| 12,094,451 B1 | 9/2024 | Zhang et al. |
| 12,107,875 B2 | 10/2024 | Hankins et al. |
| 12,127,059 B2 | 10/2024 | Melodia et al. |
| 12,133,095 B2 | 10/2024 | Ahmed et al. |
| 12,184,509 B2 | 12/2024 | Shori et al. |
| 12,185,423 B2 | 12/2024 | Zhu et al. |

(Continued)

FOREIGN PATENT DOCUMENTS

| | | |
|---|---|---|
| WO | 2022/161615 A1 | 8/2022 |
| WO | 2022/235525 A1 | 11/2022 |

(Continued)

OTHER PUBLICATIONS

Esswie, et al. "Artificial Intelligence Radio Function Model Management in a Communication Network" U.S. Appl. No. 18/072,365, filed Nov. 30, 2022, 80 pages.

(Continued)

*Primary Examiner* — Sam Bhattacharya
(74) *Attorney, Agent, or Firm* — Amin, Turocy & Watson, LLP

(57) ABSTRACT

A wireless user equipment transmits learning model information corresponding to learning models facilitating radio functions to a network node. In response, the node transmits to the user equipment a model management indication configuration corresponding to the learning model information. The user equipment monitors learning model parameter metrics, indicative of learning model performance. Monitored metrics may be used to determine a control action, or operation, to perform, based on analysis of the metrics with respect to model performance metric criterion. A model management indication may be transmitted to the user equipment indicating a determined control action. Examples of a control operation may comprise deactivating a currently operating learning model or retraining a learning model.

20 Claims, 15 Drawing Sheets

(56) References Cited

U.S. PATENT DOCUMENTS

| | | | |
|---|---|---|---|
| 12,192,820 | B2 | 1/2025 | Yeh et al. |
| 12,199,847 | B2 | 1/2025 | Kolar et al. |
| 12,207,130 | B2 | 1/2025 | Demonget et al. |
| 12,225,571 | B2 | 2/2025 | Tayal |
| 12,228,909 | B2 | 2/2025 | Wouhaybi et al. |
| 2021/0125104 | A1 | 4/2021 | Christiansen et al. |
| 2022/0083916 | A1 | 3/2022 | Khan et al. |
| 2022/0147390 | A1 | 5/2022 | Akinapelli et al. |
| 2022/0279341 | A1 | 9/2022 | Tomala et al. |
| 2022/0335337 | A1 | 10/2022 | Kovacs et al. |
| 2022/0342713 | A1 | 10/2022 | Shen et al. |
| 2023/0095981 | A1 | 3/2023 | Gundogan et al. |
| 2023/0267326 | A1 | 8/2023 | Jiang |
| 2024/0112090 | A1 | 4/2024 | Gadelrab et al. |
| 2024/0244454 | A1 | 7/2024 | Xu et al. |
| 2024/0303535 | A1 | 9/2024 | Arora et al. |
| 2024/0378450 | A1 | 11/2024 | Nimara et al. |
| 2025/0007789 | A1 | 1/2025 | Ren et al. |
| 2025/0007791 | A1 | 1/2025 | Llorente et al. |
| 2025/0021861 | A1 | 1/2025 | Sun et al. |
| 2025/0048432 | A1 | 2/2025 | Lee et al. |
| 2025/0068916 | A1 | 2/2025 | Chen et al. |
| 2025/0071575 | A1 | 2/2025 | Ryden et al. |
| 2025/0094304 | A1 | 3/2025 | Kita |
| 2025/0097091 | A1 | 3/2025 | Kita |
| 2025/0097722 | A1 | 3/2025 | Kita |

FOREIGN PATENT DOCUMENTS

| | | |
|---|---|---|
| WO | 2024047774 | 3/2024 |
| WO | 2024062716 | 3/2024 |

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

International Search Report and Written Opinion for PCT Application No. PCT/US2023/034405 mailed Feb. 5, 2024, 17 pages.

Qualcomm—Rajeev Kumar et al: "Discussion on AI/ML methods", 3GPP Draft; R2-2212659, 3GPP RAN 2, No. Toulouse, FR; Nov. 4, 2022, [https://www.3gpp.org/ftp/TSG_RAN/WG2_R L2/TSGR2_120/Docs/R2-2212659.zip R2-2212659—Discussion on AIML methods. docx], 13 pages.

Intel Corporation: "Discussion of AI/ML framework", 3GPP Draft; RI-2206577, RAN WGI, Aug. 12, 2022, [https://ftp.3gpp.org/tsg_ran/WG1_RL1/T SGRI_IIO/Docs/RI-2206577.zip RI-2206577.docx] 10 pages.

Huawei et al: "Discussion on general aspects of AI/ML framework", 3GPP Draft; RI-2208428, RAN WGI, No. e-Meeting; Sep. 30, 2022, [https://ftp.3gpp.6rg/tsg_ran/WG1_RL1/T SGRI_IIOb-e/Docs/RI-2208428.zipRI-2208428.docx], 24 pages.

Sharp—Rudraksh Shrivastava et al: "Discussion on Model Monitoring and Reporting Considering Functionality and Model ID based LCM", 3GPP Draft; R2-2307486; 3GPP RAN 2, No. Toulouse, FR; Aug. 10, 2023, [https://www.3gpp.org/ftp/TSG_RAN/WG2_R L2/TSGR2_123/Docs/R2-23074_86.zip R2-2307486.docx], 10 pages.

Invitation to Pay Additional Fees for PCT Application No. PCT/US2023/034406 mailed Feb. 14, 2024, 17 pages.

International Search Report for PCT Application No. PCT/US2023/034406 mailed Apr. 8, 2024, 24 pages.

International Search Report and Written Opinion for PCT Application No. PCT/US2023/034406 mailed Jun. 27, 2024, 26 pages.

Notification Concerning Transmittal of International Preliminary Report on Patentability mailed Jun. 12, 2025 for PCT Application No. PCT/US2023/034405, 9 pages.

European Office Action mailed Jul. 8, 2025 for European Patent Application No. 23809776.0, 3 pages.

Office Action mailed Apr. 11, 2025 for U.S. Appl. No. 18/072,365, 29 pages.

Notification Concerning Transmittal of International Preliminary Report on Patentability mailed Jun. 12, 2025 for PCT Application No. PCT/US2023/034406, 18 pages.

European Office Action mailed Jul. 8, 2025 for European Patent Application No. 23809777.8, 3 pages.

Notice of Allowance mailed Sep. 3, 2025 for U.S. Appl. No. 18/072,365, 29 pages.

ARTIFICIAL INTELLIGENCE RADIO FUNCTION MODEL MANAGEMENT IN A COMMUNICATION NETWORK

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a user equipment comprising a processor from a radio access network node, a model management indication configuration corresponding to a first radio function of the user equipment. The user equipment may monitor a model performance parameter, which may be indicated for monitoring in a first radio function model configuration corresponding to the first radio function learning model implementing a radio function on the user equipment, to result in a monitored model performance metric. The monitored model performance metric may be analyzed with respect to a model performance metric criterion to result in an analyzed monitored performance metric. The user equipment may transmit to the radio access network node, a model management indication according to the model management indication configuration based on the analyzed monitored performance metric being determined not to satisfy the model performance metric criterion, for example a threshold corresponding to a learning model parameter which a monitored metric corresponds. The example method may further comprise receiving, by the user equipment, a control instruction, corresponding to operation of the radio function learning model, that is based on the model management indication and implementing at least one control operation according to the control instruction.

The at least one control operation may comprise deactivating the first radio function learning model and activating a configured default radio function to perform the radio function, wherein the at least one control operation is determined by the radio access network node.

The first radio function model configuration may comprise at least one configured radio function model parameter value, and wherein the at least one control operation comprises retraining the first radio function learning model using the at least one configured radio function model parameter value to result in a retrained first radio function learning model. The at least one configured radio function model parameter value may be part of a retraining data set.

The first radio function model configuration may comprises at least one configured radio function model parameter value, and the method may further comprise receiving an updated first radio function model configuration comprising at least one configured updated radio function model parameter value, replacing the at least one configured radio function model parameter value with the at least one configured updated radio function model parameter value, and implementing the radio function with the first radio function learning model using the at least one configured updated radio function model parameter value, which may be part of a retaining data set.

The model management indication may comprise a control operation request that requests an updated first radio function model configuration, and the method may further comprise receiving, from the radio access network node responsive to the model management indication, the updated first radio function model configuration, responsive to receiving the updated first radio function model configuration, deactivating use of the first radio function learning model according to the first radio function model configuration, and activating the use of the first radio function learning model according to the updated first radio function model configuration. In another embodiment, the control operation may comprise an instruction to deactivate use of the first radio function learning model according to the first radio function model configuration and activating implementation of the radio function according to a previously-configured default model, which may be a configured probabilistic learning model or which may be a configured deterministic model, or function.

The at least one control operation may comprise retraining the first radio function learning model using at least one configured radio function model parameter value to result in a retrained first radio function learning model. The at least one configured radio function model parameter value may correspond to a data set that corresponds to an index. The index may be transmitted in the model management indication.

The model performance parameter comprises at least one of: a mean squared error value, a root mean squared error value, a normalized mean squared error value, a mean absolute error value, an R-squared value, a generalized cosine similarity value, a squared generalized cosine similarity value, an accuracy value, a number of true negatives value, a number of true positives value, a number of false negatives value, a number of false positives value, a precision value, a recall value, or an F1 score value.

In an embodiment, the example method may further comprise transmitting, by the user equipment to the radio access network node, an indication of radio function learning model information comprising learning model information corresponding to the first radio function wherein the indication of the radio function learning model information may comprise a first indication, wherein the learning model information comprises at least one of: at least one learning model type indication, at least one radio function indication indicating an at least one corresponding radio function, a list of at least one metric parameter corresponding to at least one learning model, corresponding to the at least one learning model type indication, to be estimated or reported, a value representing a number of learning models that the user equipment stored for implementation of the at least one corresponding radio function, or a second indication of at least one learning model category corresponding to at least one dataset to be used by the radio access network node to determine the analyzed monitored performance metric.

The first radio function learning model may be one of multiple different radio function learning models capable of implementing the radio function. The model performance parameter comprises a mathematical function, such as examples shown in Table 1.

The control instruction may comprise an instruction to perform an operation to deactivate use of the first radio function learning model, wherein the control instruction comprises an instruction to activate a second radio function learning model, of the different radio function learning models, to implement the radio function, wherein the first radio function model configuration defines the first radio function learning model and a second radio function model configuration defines the second radio function learning model, and wherein the first radio function model configuration is different from the second radio function model configuration.

In another example embodiment, a method may comprise receiving, by a radio access network node comprising a processor, from a user equipment, learning model information corresponding to a current radio function learning model of the user equipment. In the embodiment, the method may further comprise the radio access network node generating a model management indication configuration based on the learning model information; transmitting the model management indication configuration to the user equipment; receiving a performance parameter metric, associated with performance of the current radio function learning model, corresponding to a learning model performance indicator parameter; and transmitting, based on the performance parameter metric, a control instruction corresponding to operation, by the user equipment, of the current radio function learning model.

The performance parameter metric corresponds to a learning model performance indicator parameter. The learning model performance indicator parameter may comprise at least one of: a mean squared error value, a root mean squared error value, a normalized mean squared error value, mean absolute error value, an R-squared value, a generalized cosine similarity value, a squared generalized cosine similarity value, an accuracy value, a number of true negatives value, a number of true positives value, a number of false negatives value, a number of false positives value, a precision value, a recall value, or an F1 score value.

The learning model information may comprises at least one of: at least one learning model type indication, at least one radio function indication indicating a corresponding at least one radio function, at least one metric corresponding to at least one learning model, corresponding to the at least one learning model type indication, to be estimated or reported, a number of learning models that the user equipment is able to store for the at least one radio function, or an indication of at least one learning model category corresponding to at least one dataset to be used by the radio access network node to determine the performance parameter metric.

The model management indication may comprise a data size that is based at least on the performance parameter metric. Thus, depending on a metric being monitored and reported, the amount of data, (e.g., number of bytes) used to transmit the metric may vary. Using a quantized indication of a monitored metric may result in a transmitted data size of the indicated metric using fewer bytes or a configured, uniform number of bytes, for example. Accordingly, the performance parameter metric may be indicated by a configured quantized performance parameter metric value, or quantization, index. A quantization value, or index, may correspond to a range that a monitored metric value falls within. In an embodiment, the model management indication configuration comprises the quantized performance parameter metric value. In an embodiment, the performance parameter metric may be a preamble corresponding to the user equipment.

The control instruction comprises an instruction to deactivate the current radio function learning model and to activate a default radio function. The control instruction comprises an instruction to train the current radio function learning model to result in an updated radio function learning model. The control instruction may comprise a recommended configured training data set indication indicating a configured training data set, which may be configured at the user equipment, to be used to train the current radio function learning model.

The example method embodiment may further comprise analyzing the performance parameter metric with respect to a performance parameter metric criterion to result in an analyzed performance parameter metric, determining that the analyzed performance parameter metric fails to satisfy the performance parameter metric criterion, and determining to transmit the control instruction based on the performance parameter metric being determined not to satisfy the performance parameter metric criterion.

In an embodiment, the model management indication comprises a request from the user equipment to transmit the control instruction.

In another embodiment, the radio access network node in operative communication with multiple user equipment, may be configured to receive from a second user equipment, a second radio function learning model information indication comprising learning model information corresponding to a second radio function learning model of the second user equipment. The radio access network node may generate a second model management indication configuration corresponding to the second radio function learning model, transmit the second model management indication configuration to the second user equipment, and receive, from the second user equipment, a second performance parameter metric, associated with performance of the second radio function learning model. The second performance parameter metric may correspond to a second learning model performance indicator parameter; and the radio access network node may transmit, to the second user equipment based on the second performance parameter metric, a second control instruction corresponding to operation of the second radio function learning model by the second user equipment, wherein the first radio function learning model corresponds to a first learning model type, wherein the second radio function learning model corresponds to a second learning model type, wherein the first learning model type and the second learning model type are a same type, wherein the first learning model type operates according to a first learning model configuration and the second learning model type operates according to a second learning model configuration, and wherein the first learning model configuration is different from the second learning model configuration. The second control instruction corresponding to operation of the second radio function learning model by the second user equipment may be based on analysis of the second performance parameter metric with respect to a criterion by the user equipment.

In an embodiment, the analysis may be performed by the radio access network node. In an embodiment, the analysis may be based on current or historical performance data of a learning model at a user equipment, which may comprise many data metrics. The learning model performance data may be combined with network operational conditions, contextual information, for example environmental or weather-related. Data used for the performance analysis may be directly generated by network equipment or may be provided by a third-party application. Thus, based on a radio access network node having a larger perspective of network aspects that a user equipment does, data used for analysis, for example determining criterion to compare a learning model parameter metric to, may facilitate capability of a user equipment in determining learning model performance that it may be using to facilitate a radio function.

DETAILED DESCRIPTION OF THE DRAWINGS

Figure 1:
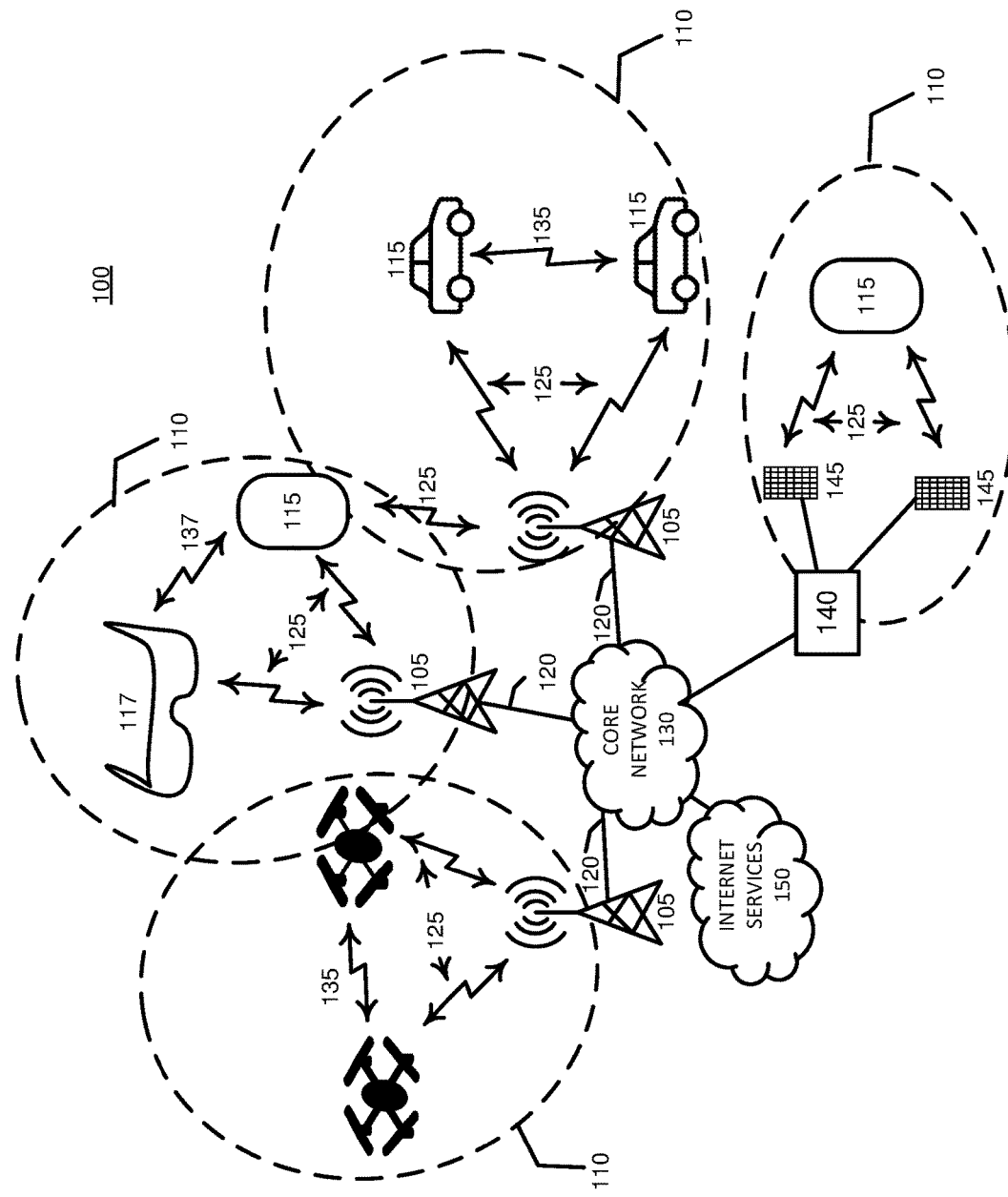
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. AI/ML functionality can be implemented and structured in many different forms and with varying vendor-proprietary designs. A 5G radio network may be only aware of a user equipment's AI/ML functionality and capability, including radio functionality performed by, or enhanced by, learning models. To facilitate consistent behavior of user equipment devices, a radio access network node ("RAN") of a network to which the user equipment devices may be attached to or registered with manages or controls real-time AI/ML model performance at different user equipment devices for various radio functions, even if the RAN is unaware of actual AI/ML model implementation(s) at each user equipment device. Such management or control may facilitate minimizing propagation of learning model errors corresponding to an ill-performing AI/ML model at a device over multiple instants of execution of the respective radio function execution, which can degrade performance of the radio function.

As disclosed herein, several embodiments facilitate dynamic management of various AI/ML models deployed at different user equipment devices. A network RAN can dynamically control activation, deactivation, and triggering of model retraining (that may be radio-function-specific) of a learning model depending on monitoring and analysis of defined real-time performance metrics corresponding to a learning model. Hence, this allows for detecting ill performing AI/ML models in near real-time. It will be appreciated that in some embodiments disclosed herein, even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Conventional rules-based models may be implemented in user equipment to perform various radio frequency ("RF") functions or signal processing functions, such as, beamforming, channel estimation, demodulation, and decoding, and may be based on well-established system models. Such models may result in satisfactory performance as long as the models closely follow actual behavior of a radio network system in which the user equipment is/are operating. However, performance of the traditional conventional models may provide less than optimal performance. AI/ML-based models typically outperform their conventional counterparts; unlike conventional rules-based models, AI/ML-based models may be based on data rather than rules of a predetermined conventional model. Thus, outputs or outcomes of conventional rules-based models may be deemed as 'deterministic' because inputs are applied to static rules that result in a 'determined' output whereas outputs or outcomes of an AI/ML model may be viewed as probabilistic because, a learning model typically infers a probable output based on coefficients, factors, functions, or other variables that may have been arrived at based on on previous inputs to the model.

Although an AI/ML-based model trained using data from actual, real-world operation, can potentially outperform a traditional rules-based model, a learning model may be less robust, and thus provide less desirable results, in situations where the radio system/environment may have undergone changes that may not have been experienced, or 'seen', during training of the learning model, and thus the learning model may infer less-than-undesirable outputs than a static rules-based model in such an situation that is 'unknown' to the learning model. This problematic situation may be caused by, for example, specific network/user equipment conditions or configurations, or by an architecture of an AI/ML learning model, or a combination thereof. Therefore, it is it is desirable to implement procedures such that a network RAN can monitor AI/ML learning model performance of user equipment via UE feedback/signaling and to react to metrics corresponding to such monitoring that may enable fallback mechanisms, or that initiate, trigger, or otherwise cause retraining of an ill-performing learning model (e.g., ill-performing as determined from the monitored learning model metrics) at the user equipment.

Unlike conventional rule-based solutions, AI/ML learning model implementations of radio functions are probabilistic in nature, (e.g., no deterministic output will be determined for a certain input), and output will depend on the number and quality of samples seen during training for a given model architecture.

For instance, for an AI/ML learning model implementation of a radio function at a user equipment, the user equipment or gNB/RAN may predict modulation and coding schemes ("MCS"), and a given amount of channel state information reporting instants may be used therefor. However, a channel condition or an interference condition that did not exist during training may systematically result a bad MCS selection, which accordingly may lead to violating minimum device performance targets. Furthermore, variable conditions make user equipment device performance testing problematic due to the probabilistic nature of the AI/ML learning models. Thus, a network RAN becoming aware of AI/ML learning model performance in near-real time may facilitate dynamically preempting, managing, or calibrating the AI/ML learning model. Such control allows the network to activate or deactivate detected ill-performing AI/ML learning models, or potentially assist user equipment devices by triggering adaptive model retraining or dataset distribution to support/accelerate retraining of the learning models and accordingly, to help the user equipment recover satisfactory performance of AI/ML model performance.

Embodiments disclosed herein may facilitate a RAN (e.g., by equipment that is part of the RAN) in dynamically managing and controlling performance of various AI/ML learning models, which may be facilitating different radio functions at multiple user equipment devices. Non-controlled AI/ML learning model performance may result in, or permit, degradation of radio function, and accordingly, may lead to violating a given user equipment's minimum performance requirements. Embodiments for a RAN dynamically managing different AI/ML proprietary learning models at various user equipment facilitates detecting and possibly recovering ill-performing models by additional assistance inference retraining signaling or data sets.

Embodiments disclosed herein may comprise dynamically managing AI/ML models at different user equipment devices by the network RAN nodes, and may comprise defining and compiling model-specific performance metrics, dynamic reporting of AI/ML learning model performance metrics, and adaptive inference retraining assistance, which may be tuned to a given radio function being facilitated by a corresponding AI/ML learning model.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a Now Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
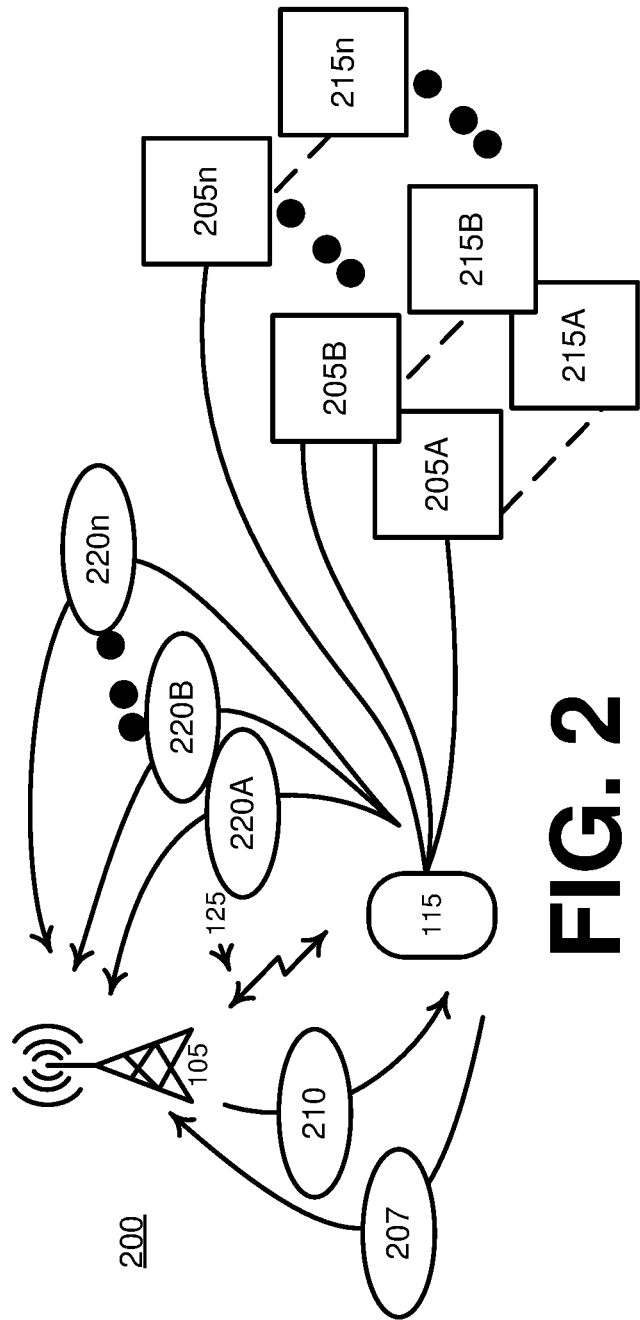
FIG. 2 illustrates an example environment with radio functions implemented in conjunction with corresponding learning models.

Turning now to FIG. 2, the figure illustrates a system 200 comprising a RAN node 105 in communication with a user equipment 115 via wireless link 125. UE 115 may perform various radio functions 205A-205n that may be facilitated by corresponding machine learning models 215A-215n, respectively. UE 115 may transmit an indication of radio function learning model information 207 to RAN 105. RAN 105 may transmit to UE 115 a machine learning model management indication configuration 210 corresponding to, or based on, learning model information 207. During UE 115 wireless operation and communication with RAN 105, the UE may transmit parameter metric reports 220A-220n, that may comprise one or more learning model parameter metrics, corresponding to 215A-215n, respectively. In an embodiment, reports 220A-220n may comprise one or more control action requests, for example, requesting that one or more of models 215A-215n be deactivated, or retrained. A control action request may be determined by UE 115 based on monitored metrics corresponding to operations of models 215A-215n, or a control action may be determined by RAN 115 based on monitored metrics transmitted in one or more reports 220A-220n.

AI/ML model inference performance monitoring and dynamic reporting of AI/ML model performance indications.

A network RAN may monitor a UEs learning model inference performance by sending a testing data set to the UE. The RAN can additionally provide the UE with optional one or more minimum performance requirements associated with the testing data set. The testing data set can be sent periodically according to a network-configured period or a testing data set can be transmitted to a UE dynamically based on a trigger, (e.g., change of a serving node/RAN providing wireless network service to a UE). A network RAN may provide a UE with test data set(s) that may represent current conditions experienced by the UE, which conditions the RAN typically can 'know', or determine, based on information related to UE channel and radio environment determined via various UE reports or sensing information that may be provided from the UE to the RAN. Attributes of testing data sets, size of the data set, or format can be configured per UE or per a group of related UEs.

AI/ML learning models, such as models 215 shown in FIG. 2 deployed at UE device 115 may be implementation-specific, (e.g., vendor proprietary learning models). (Examples of vendors that may provide proprietary learning models may comprise user equipment manufacturers or providers of applications for user equipment, network equipment providers or providers of applications for network equipment, or mobile network operators or providers of applications for mobile network operators.) The network RAN may determine overall performance of learning models deployed at a UE to facilitate minimum device performance requirements. As disclosed herein, a dynamic reporting procedure may facilitate user equipment devices compiling and reporting indications, which may be configured, or preconfigured, that reflect, or indicate, model performance of corresponding learning models.

A particular user equipment device may adopt several different AI/ML learning model implementations for running, performing, or otherwise facilitating different radio functions. Different learning model parameter metrics may be indicative of performance of different learning models. Embodiments disclosed herein may enable user equipment devices to compile and report one or more different learning model performance-indicating parameter metrics, or indications, per each learning model. Different learning model metrics may be associated with different respective filtering or time resolution configurations. Thus, such customized metric reporting for a given learning model may facilitate optimized tracking and reporting for each active learning model of each user equipment device 115 that may be served by a RAN 105, as shown in FIG. 1 or FIG. 2. Accordingly, a network RAN 105 can obtain and use real-time performance of each learning model active at a UE 115 to facilitate optimum performance of the learning model and inferences it may generate. Furthermore, several reporting variants may be tailored to suit various AI/ML learning model implementations and purposes. For example, exact absolute, exact relative, quantized, or temporal (e.g., historical) metric reporting are disclosed and described herein. Network node RAN 105 may dynamically trade AI/ML learning model reporting overhead for accuracy in obtaining AI/ML model performance metrics.

For AI/ML learning model performance, various parameters, and metrics corresponding thereto, may be considered, analyzed, or evaluated depending on the nature of the problem being solved and corresponding learning model functionality (for example, regression or classification), or radio function being performed or facilitated by a learning model. For example, for a radio function such as channel estimation or channel state information ("CSI") compression, a regression function may be used in a learning model with the following parameters, or metrics corresponding thereto, potentially being evaluated: Mean squared error ("MSE"); Root mean squared error ("RMSE"); Normalized mean squared error ("NMSE"); Mean absolute error ("MAE"); R-squared; Generalized cosine similarity ("GCS"); or Squared generalized cosine similarity ("SGCS"). Table 1 shows example functions defining corresponding learning model parameters, metrics corresponding to which may be monitored and evaluated as listed above.

TABLE 1

| Learning Model Parameter | Definition |
| --- | --- |
| Mean squared error | $\frac{1}{N}\sum_{i=1}^{N}(y_i - \hat{y}_i)^2$ |
| Root mean squared error | $\sqrt{\frac{1}{N}\sum_{i=1}^{N}(y_i - \hat{y}_i)^2}$ |
| Normalized mean squared error | $\frac{1}{N}\sum_{i=1}^{N}\frac{(y_i - \hat{y}_i)^2}{y_i^2}$ |
| Mean absolute error | $\frac{1}{N}\sum_{i=1}^{N}|y_i - \hat{y}_i|$ |
| R-squared | $1 - \frac{\sum_{i=1}^{N}(y_i - \hat{y}_i)^2}{\sum_{i=1}^{N}(y_i - \bar{y})^2}$ |
| Generalized cosine similarity | $\frac{1}{N}\sum_{i=1}^{N}\frac{|y_i^H \hat{y}_i|}{\|y_i\|\|\hat{y}_i\|}$ |
| Squared generalized cosine similarity | $\frac{1}{N}\sum_{i=1}^{N}\frac{|y_i^H \hat{y}_i|^2}{\|y_i\|^2\|\hat{y}_i\|^2}$ |

For a classification problem such as beam index prediction, an accuracy parameter metric can be analyzed to determine performance of a learning model that is facilitating beam index predictions. Other example learning model parameter metrics that may indicate performance of learning models resolving a classification problem, may include, but are not limited to: absolute numbers of true negatives, true positives, false negatives, and false positives; Precision and recall; or an F1 score. An F1-score may comprise an evaluation metric, that is used to express the performance of a machine learning model, or classifier and provides combined information about the precision and recall of the learning model. A high F1-score metric typically indicates a high value for both recall and precision metrics.

AI/ML learning model implementations at different devices may be vendor-proprietary as described above, and may be transparent to network nodes (e.g., a RAN serving a UE may not have access to specific functions and programming of a given learning model deployed in the UE that facilitates radio functions). To manage and facilitate a UE device in achieving performance targets, the network RAN may be made aware of the UE device's capability and an overall AI/ML learning model performance. Therefore, active UE devices, upon first connecting to a serving network RAN, may transmit device-specific AI/ML capability information including the following information elements ("IE"s): Type of AI/ML supported algorithms including supervised learning, unsupervised learning, and reinforcement learning; List of AI/ML supported radio functions; List of supported AI/ML model-specific metrics to estimate and report; Model bank size of each radio function, e.g., number of models that can be stored for each radio function; or Indication of model categorization (small/medium/large), which may facilitate the network RAN in defining, or determining, a dataset to be used by a learning model. For example, for a large number of neurons (e.g., nodes of a learning model neural network), determination of a commensurate number of information samples may be used to avoid overfitting by the learning model. AI/ML capability IEs can be part of device capability signaling based on the subsequent radio resource control ("RRC") signaling or based on a dynamically scheduled uplink control information ("UCI") transmission.

Figure 3A:
FIGS. 3A, 3B, 3C and 3D illustrate learning-model metric-reporting embodiments.

Accordingly, a network RAN may configure AI/ML learning-model-capable UE devices to monitor, or estimate, and report certain model-specific parameter metrics indicative of learning model performance and report the monitored metrics over an uplink channels as model management indication transmissions. A learning model may be identified in a model management indication by a network-assigned model identifier. As depicted by FIG. 3A, in one embodiment, a model management indication includes independent performance metrics 310, 315, and 320 corresponding to active AI/ML models 215A, 215B, and 215n shown in FIG. 2, respectively, at a UE device running the models. Metrics 310, 315, and 320 may correspond to model identifiers 311, 316, and 321, respectively. Enabling multiple metric configurations and reporting per each model allows devices and network to coordinate on the best AI/ML performance metric that reflects a realistic performance of the respective AI/ML model since different models may be represented by various performance metrics, with different calculation complexity and reporting overhead. A RAN or a UE may determine a metric configuration to use for reporting learning model metrics that indicate learning model performance. Varying metric reporting may result in a size of a model management indication to varying with respect to time, depending on active models, and corresponding reported metric sizes (e.g., various performance metrics at a time may have different sizes, either being reported as an exact value or as a quantized level or range that corresponds to a value). Thus, a model management indication may be dynamically scheduled over an uplink data channel (PUSCH) to facilitate scheduling efficiency and flexibility.

Examples of analyzing monitored metric value with respect to model performance metric criterion may comprise a criterion being a threshold value and a user equipment comparing a monitored metric to the threshold value (e.g., comparing a mean square error ("MSE")) or comparing any other monitored metric value from Table 1 to the threshold value and if MSE is larger than the threshold reporting to the radio access network). Another example may comprise a criterion being a range of values and the user equipment determining whether a monitored metric value is within the given range and reporting to the radio access network if the monitored metric lies outside the criterion range.

In FIG. 3A, dynamic learning model management metric report 305 may dynamically report learning-model-specific metrics according to learning model identifiers corresponding to respective learning models. Report 305 may comprise metric reports 310, 315, and 320 corresponding respectively to learning models 215A, 215B, and 215n shown in FIG. 2.

Figure 3B:
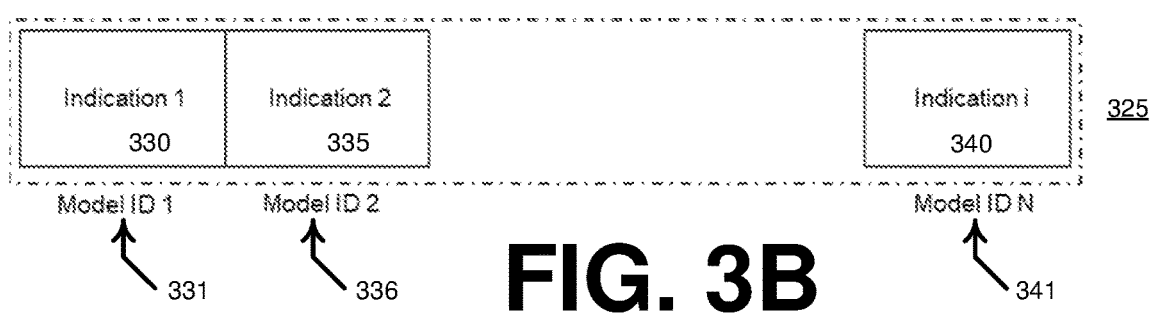

To reduce overhead of reporting an AI/ML model management indications, quantization of the model-specific performance metrics may be used, where metric-specific quantization levels, corresponding to ranges, may be configured by a RAN. As shown in FIG. 3B, UE devices, transmitting a model management indication, may select a quantized representation of an estimated model-specific metrics, instead of exact metric-value reporting, leading to a reduction in an aggregate size of the model management indication. Quantized indication can be in the form of: Consecutive quantized level indications, i.e., bitwise, or Sequence/preamble representation of determined quantized metric levels. An example of quantizing would be an actual metric value for a parameter determined by a UE to fall within a range may transmit an index value, instead of the actual metric value, to reduce an amount of data used to transmit a model management indication to a serving RAN.

In another embodiment, a network RAN may configure AI/ML learning-model-capable devices with learning model parameter metric criterion, which may be referred to as a model performance metric criterion, for example a threshold, associated with an active AI/ML model. Accordingly, upon a UE device's learning model failing, or violating a configured learning-model-specific performance metric threshold, the UE may transmit a model-specific 'FAIL' indication to a serving RAN. Thus, the network RAN may determine whether to trigger a retraining data set, or not, based on the received model-FAIL indications. In FIG. 3B an example dynamic learning model management metric report 325 may dynamically report learning-model-specific quantized learning model metrics according to learning model identifiers corresponding to respective learning models. Report 325 may comprise metric reports 330, 335, and 340 corresponding respectively to learning models 215A, 215B, and 215n shown in FIG. 2. Metric reports 330, 335, and 340 may correspond to model identifiers 331, 336, and 341, respectively.

Figure 3C:
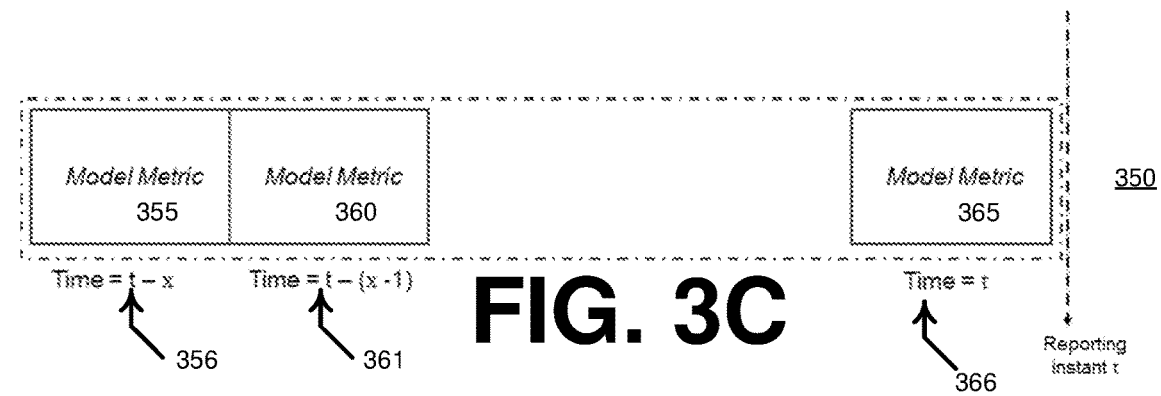

In another embodiment, the network RAN can configure UE devices to temporally report historical model-specific performance metrics over a configured period of time. This may be useful for AI/ML learning models that predict a certain radio condition or action over a future set of time instants, (e.g., temporal models). Accordingly, as shown in FIG. 3C, a UE device may compile a model-specific model management indication report, including an exact, or quantized, indication for a selected model-specific parameter, over the configured historical or temporal reporting period. In another embodiment, the network RAN may configure UE devices with filtered temporal reporting of a certain model parameter metric, (e.g., indicated by the corresponding model ID). This may indicate that UE devices perform filtering of the selected model-specific metric samples over the configured reporting period, according to the indicated Layer-1 filter type and filtering coefficients, thus further reducing network resource overhead (which can otherwise be used for transmitting traffic data) used reporting the model management indications.

In FIG. 3C, an example historical learning model management metric report 350 may report historical learning-model-specific learning model metrics according to a learning model identifier corresponding to a learning model. Report 350 may comprise metric reports 355, 360, and 365 corresponding to, for example, one of learning models 215, x2, and x3 shown in FIG. 2. Metric reports 355, 360, and 365 may correspond to metric report identifiers 356, 361, and 365, respectively.

Figure 3D:
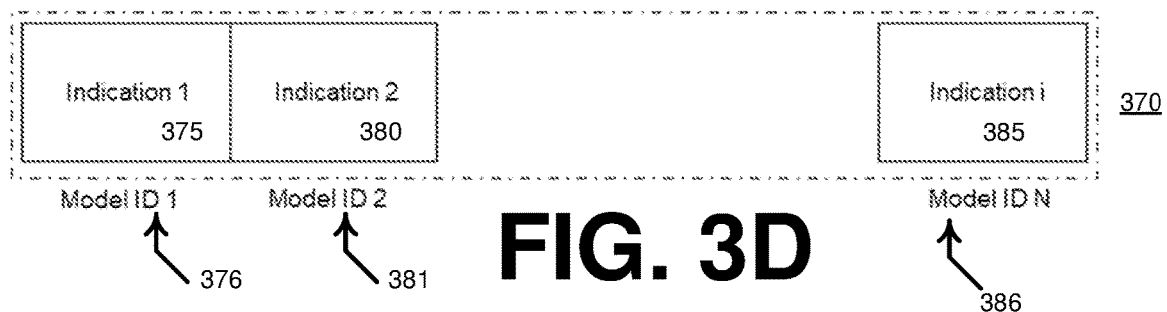

FIG. 3D illustrates an embodiment of an example historical learning model management metric report 370 that may report historical learning-model-specific learning model metrics according to learning model identifiers corresponding to respective learning models. Report 370 may comprise metric reports 375, 380, and 385 corresponding respectively to, for example learning models 215A, 215B, and 215n shown in FIG. 2. Metric reports 375, 380, and 385 may correspond to model identifiers 376, 381, and 386, respectively. Thus, each metric 375, 380, and 385 may comprise a historical report for a respective model 376, 381, and 386, respectively. A report 375, 380, and 385 may comprise information or data as may be contained in a historical report 350 described in reference to FIG. 3A. In other words, a report 375, 380, and 385 may comprise historical reports 350, each historical report corresponding to a different model. Thus, a report 370 may comprise multiple reports 350 that each correspond to a different learning model.

Figure 4:
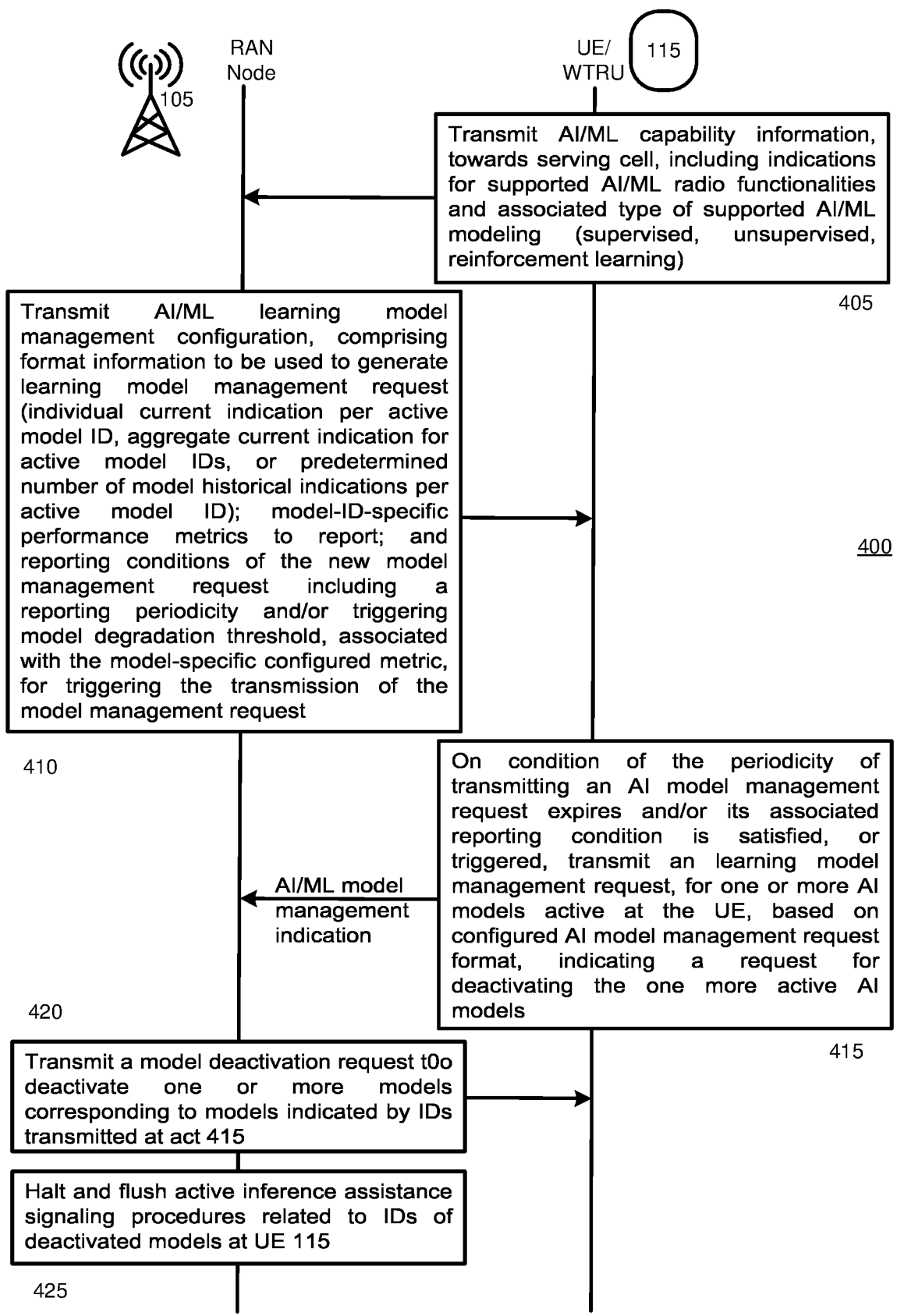
FIG. 4 illustrates a timing diagram an example embodiment method to configure a user equipment to manage a radio function learning model.

Turning now to FIG. 4, the figure illustrates a timing diagram of an example method to configure a user equipment 115 with a learning model metric reporting configuration from a network node/RAN 105. At act 405, UE or wireless transmit and receive unit (WTRU) 115 (sometimes referred to below as merely UE 115) transmits capability information that may comprise an indication of radio function learning model information, which may comprise learning model information corresponding to one or more radio function learning models of the user equipment, to serving cell RAN 105. The capability information may comprise indications for one or more radio functions that may be implemented by, operated by, performed by, or otherwise facilitated by, UE 115. The capability information may comprise information that indicates types of AI/ML learning models (e.g., supervised, unsupervised, reinforcement learning, and the like) that may correspond to, support, or facilitate, the radio functions. At act 410, RAN 105 transmits, and UE/WTRU 115, receives one or more AI/ML learning model management configurations from RAN 105. A learning model management configuration may comprise format information corresponding to an AI/ML model management request that may be made by UE 115.

The format information transmitted and received at act 410 may comprise: information to be used by UE 115 to generate a current indication of learning model metrics per active learning model which may have a model identifiers assigned by RAN 105 associated therewith; information to generate an indication of aggregate metric information corresponding to multiple or all learning models that may be currently active according to the models' associated model identifiers assigned by RAN 105; information corresponding to a determined, or configured, number of learning model's, or models', historical metrics per active learning model; and corresponding RAN-assigned model identifiers. The format information may comprise learning-model-specific performance metrics to report according to a model identifier, or reporting conditions, of a model management request, including a reporting periodicity, or a learning model degradation criterion, which may be referred to as a model performance metric criterion, for example a threshold, associated with the model-specific configured metric, to be used to trigger transmission of the model management request from UE 115 to RAN 105 based on a model performance metric criterion not being satisfied.

At act 415, on condition of the periodicity of transmitting an AI/ML learning model management request having expired or an associated reporting condition corresponding to the learning model having been fulfilled (e.g., a monitored metric failing to satisfy a criterion), UE/WTRU 115 may transmit a learning model management request, corresponding to one or more of AI/ML learning models that may be actively facilitating radio functionality at the UE models, based on a configured AI model management request format, indicating a request for deactivating one or more of active AI models.

RAN 105 receives the learning model management request transmitted at act 415 by UE 115, which may have active AI/ML learning models actively facilitating radio functions. At act 420, RAN node 105 may transmit a model deactivation request, associated with one or more of the indicated model identifiers of one or more learning models operating on UE 115. A model deactivation request may instruct UE 115 to deactivate one or more learning models that are currently facilitating radio functions such that the radio functions revert to operation according to a previous learning model configuration, a default learning model configuration, or a default deterministic radio function model. At act 425, RAN node 105 may halt or flush active inference assistance signaling procedures that may correspond to a deactivated model at UE 115 according to a learning model identifier associated with the deactivated learning model at UE 115.

In an embodiment, RAN 105 may transmit at act 420 a request for UE 115 to retransmit the learning model management request that was transmitted at act 415 to verify that a problem exists at the UE.

AI/ML model retraining.

In case of an ill-performing AI/ML learning model, detected based on, for example, embodiments described in reference to FIG. 2, 3, or 4, a serving RAN can assist served UE devices with additional training data sets to calibrate and recover degraded inference performance of the ill-performing model, or models. The additional training data sets may be specific to a radio function which is facilitated by the ill-performing AI/ML model. Accordingly, a definition of a list of training data codebooks, where each one or more codebook is associated with a certain radio function such as power control, scheduling, or beam management, for example. A training codebook may comprise a training data set that is particularly designed to train or calibrate learning models performing a certain radio function. Accordingly, a training codebook may indicate to UE devices various data sets, training/retraining duration, timing resolutions (e.g., timing ticks or instants between retraining data transmissions in terms of OFDM symbols, mini-slots, slots, frames, aggregated number of frames, and the like), or a dynamically or semi-statically configured resource set to be used for a model. A RAN node may configure devices with available training codebooks for various radio functions. On condition of user equipment devices or network nodes (based on metrics transmitted by a user equipment) detecting, or determining, ill-performing models for one or more active radio functions, a request indication indicating a request for inference retraining or model recovery may be transmitted with a recommended inference codebook determined based on the real-time performance of the AI/ML model (based on monitored metrics) and tolerances/requirements of the respective radio function. The network RAN may dynamically or semi-statically schedule transmission of a selected training data set with the respective timing duration, resource size, and timing resolution. Multiple available data sets for each AI/ML-facilitated radio function may be transmitted to facilitate AI/ML learning models, performing differently for the same radio function, to have training data sets customized with respect to their respective real-time AI/ML performance.

The performance of various AI/ML models, executing different radio functions, may depends on several factors including traffic channel conditions, traffic distribution, interference statistics, link adaptation, scheduling determinations, and the like. Such factors may be time-varying, with variation rates being dependent on factors such as the traffic load level of a RAN, or traffic transmission types (e.g., short and sporadic transmissions or large payload transmissions). Thus, an AI/ML learning model at a user equipment device may occasionally be refined to obtain, or to retain, desirable inference performance of the learning model. In an example, for an implementation having an AI/ML learning model exclusively running at a user equipment, the network RAN may provide assistance signaling and data sets for calibrating and refining corresponding inference performance in case ill-performing AI/ML learning models are detected (e.g., learning model metrics do not satisfy a learning model parameter criterion, or criteria).

Figure 5:
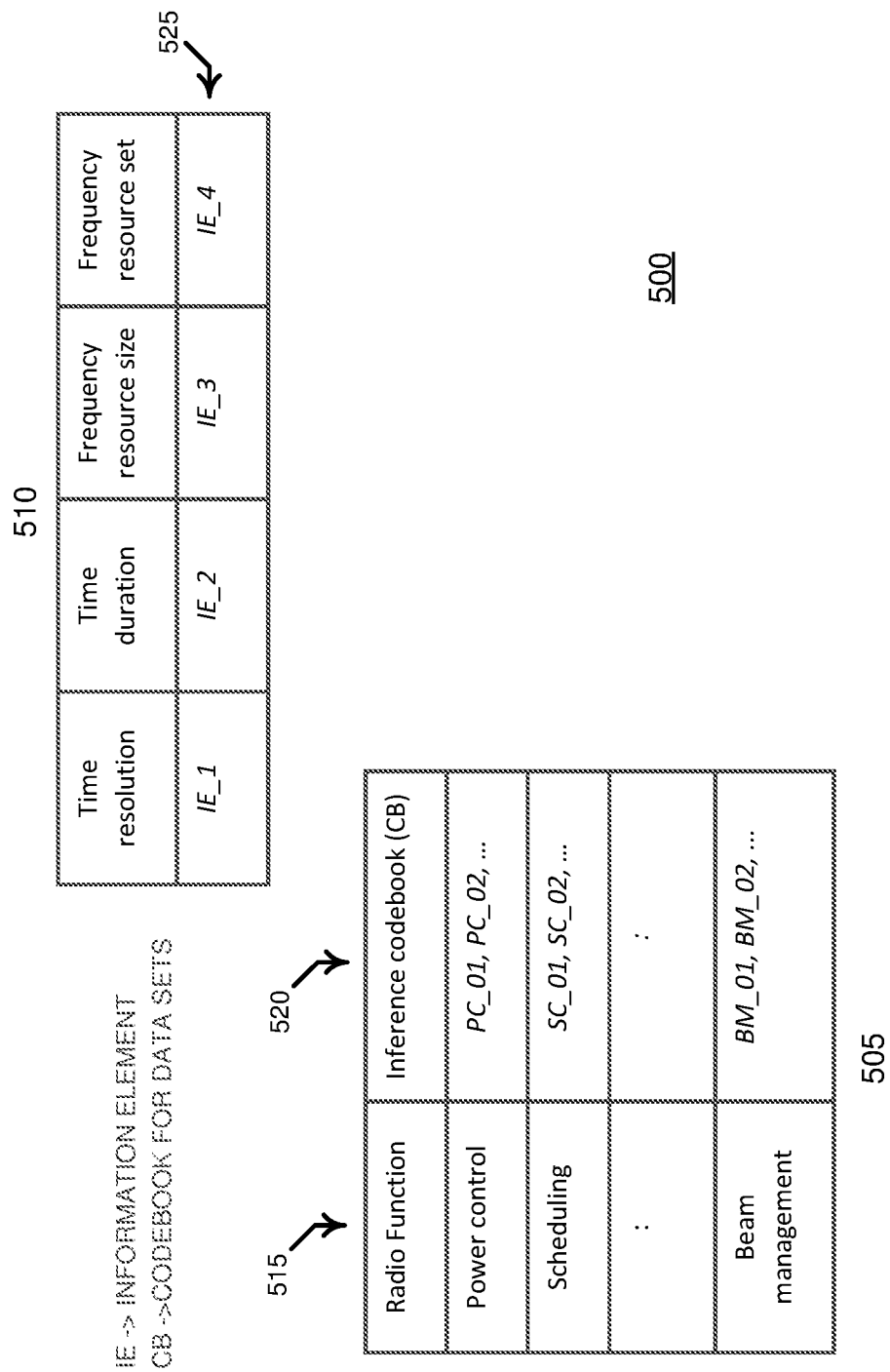
FIG. 5 illustrates an example embodiment radio function learning model retraining configuration.

In an example learning model management retraining configuration 500 illustrated in FIG. 5, inference retraining data sets 520 may be specific to each of one or more radio functions 515 that may be executed by, or facilitated by, corresponding to-be-refined AI/ML models at a user equipment. AI/ML learning models, which may be facilitating different radio functions, may be configured, or reconfigured, with different inference retraining data sets. For example, an AI/ML learning model, facilitating a radio function of deriving power control at a user equipment device, may use a data set that causes the user equipment to perform several uplink transmissions with several transmission power level values and power control parameters. However, a different learning model facilitating, for example, deriving beam management, may use a data set that comprises parameters used to facilitate beam sweeping, beam detection, and beam recovery procedures. Thus, AI/ML-capable user equipment devices may be configured with various AI/ML inference retraining data sets 520, where a retraining set may be associated with a certain radio function 515 and can be dynamically configured in terms of parameters 525 that may comprise data set length, resource size, time resolutions, and coordinated network-device actions. A retraining data set 520 may be delivered to user equipment devices using system information blocks, RRC setup signaling, or via through direct downlink control information ("DCI"). Furthermore, for certain radio functions, a network RAN can provide samples and labels simultaneously in a data set 520. For other radio functions, a RAN may initially transmit a first dataset 520 (e.g., samples), then transmit a second dataset 520 (e.g., labels) after network processing information has been transmitted. Such piecemeal transmission of a dataset 520 may be used, for example, if a network RAN does not have exact user equipment device conditions information available to use in generating labels.

Accordingly, AI/ML-capable user equipment devices may request inference retraining from a serving RAN with an indication of a recommended inference retraining data set or codebook 520 corresponding to a respective radio function 510 of a pre-configured inference retraining list and associated respective available inference data sets/codebooks of the radio function. User equipment devices can select, and include in the request, inference retraining data sets, in terms of data length, resource size, and timing resolution, based on current conditions of active AI/ML learning models and corresponding radio functions being executed by the user equipment. The network RAN may in response transmit to the requesting user equipment device an inference retraining data set based on the requested inference retraining data set. In an embodiment, channel resources for transmitting of inference retraining data set can be dynamically scheduled, for example using DCI signaling, according to a resource set size indicated by the user equipment device. In an embodiment, transmitting of the inference retraining data set can be semi-statically configured based on the inference retraining data set codebooks, for example using RRC signaling and pre-reserved resource pools.

In another example embodiment, inference training data sets can be either labeled or non-labeled, to facilitate AI/ML learning models utilizing supervised or non-supervised learning capabilities, respectively. Accordingly, a network RAN may transmit inference data samples and respective labels of each data sample. A data label of an inference training data set can be dynamically configured depending on a use-case, AI/ML-learning-model-facilitated, radio function. Various labels can indicate different radio parameters, or settings, which may be adopted when the inference training data set is transmitted.

Therefore, a network RAN may transmit an inference training codebook set with an associated label set, or a network RAN may transmit individual inference data sets, or label sets for previously transmitted respective inference data sets. The latter case may be useful in certain AI/ML learning model deployments in which user equipment devices may have already received inference data samples but may still lack the label set associated therewith, in which case a user equipment device may transmit to a serving cell RAN a request for an AI/ML learning model label set that corresponds to a previously received set of inference samples.

Figure 6:
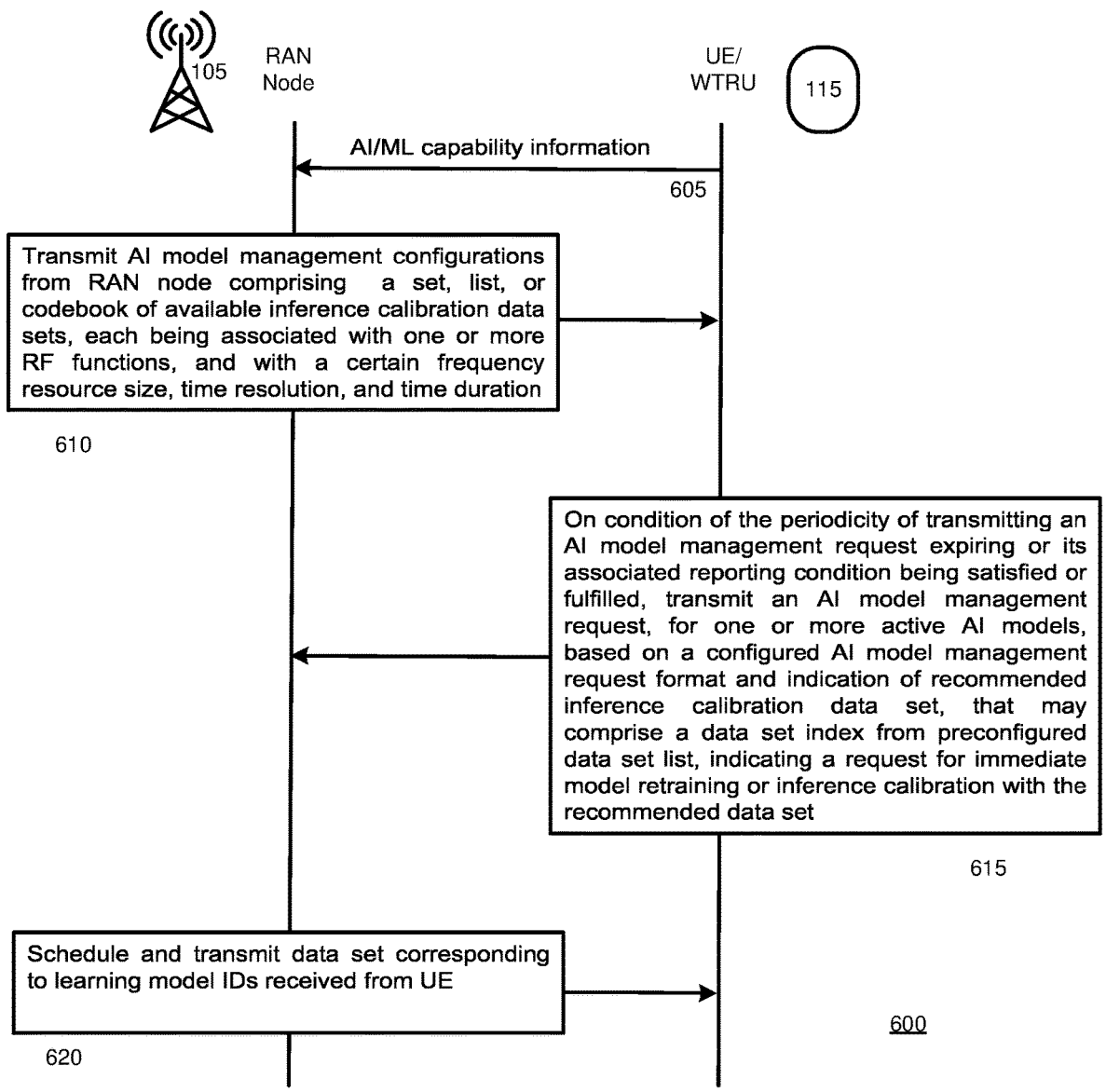
FIG. 6 illustrates timing diagram of an example embodiment method to configure a user equipment to retrain a radio function learning model.

Turning now to FIG. 6, the figure illustrates a timing diagram of an example method embodiment 600 to configure a user equipment 115 with a learning model management retraining configuration from a network node/RAN 105. At act 605, user equipment 115 transmits learning model capability, similarly to the transmission of learning model capability as described in reference to act 405 shown in FIG. 4. Continuing with description of FIG. 6, RAN 105, based on information transmitted by UE 115 at act 605, transmits, at act 610, an AI/ML learning model management configuration to UE 115 that may comprise a set, a list, or a codebook of available inference retraining data sets, such as sets 520 shown in FIG. 5, with each being associated with one or more RF functions 515 and with a corresponding frequency resource size, time resolution, and time duration, such as represented by information elements 525 in FIG. 5. Continuing with description of FIG. 6, at act 615, on condition of a configured periodicity of transmitting the AI model management request expire having expired, or a reporting condition associated with the triggering of transmitting of the model management request being satisfied, or fulfilled, UE 115 transmits an AI/ML learning model management request to UE 115, for one or more AI/ML learning models that are active at the UE. The AI/ML model management request may be generated or transmitted according to a configured AI model management request format and may include an indication of a recommended inference retraining data set. In an embodiment, an indication of a recommended inference retraining data set may comprise a data set index, selected from a preconfigured data set list, indicating a request for immediate model retraining or inference retraining with the recommended data set.

The AI/ML learning model management configuration transmitted at act 610 may comprise a format for generating or transmitting information of an AI model management request, for example, for an individual and current indication per active models associated with a model identifier, for an aggregate and current indication active model identifiers, or predetermined, or configured, number of model historical indications per active model corresponding to respective model identifiers. The AI/ML learning model management configuration may comprise reporting conditions, or criterion, that if satisfied, met, or otherwise triggered, may cause generating by, or transmitting by, UE 115 a model management request. The reporting conditions may comprise a model parameter metric criterion, or criteria, such as, for example, a reporting periodicity or a learning model degradation criterion, which may be referred to as a model performance metric criterion, for example a threshold, to be used to trigger transmission of a model management request based the criterion, or criteria, not being satisfied.

RAN node 105 receives AI/ML a learning model management request transmitted from UE 115 at act 615, and, at act 620, RAN 105 schedules and transmits a retraining data set corresponding to model identifiers indicated in a request transmitted at act 615. A retraining data set be transmitted from RAN 105 to UE 115 as part of a control instruction transmission. UE 115 may perform retraining according to the received retraining data set, or sets, or other information transmitted at act 620.

Figure 7:
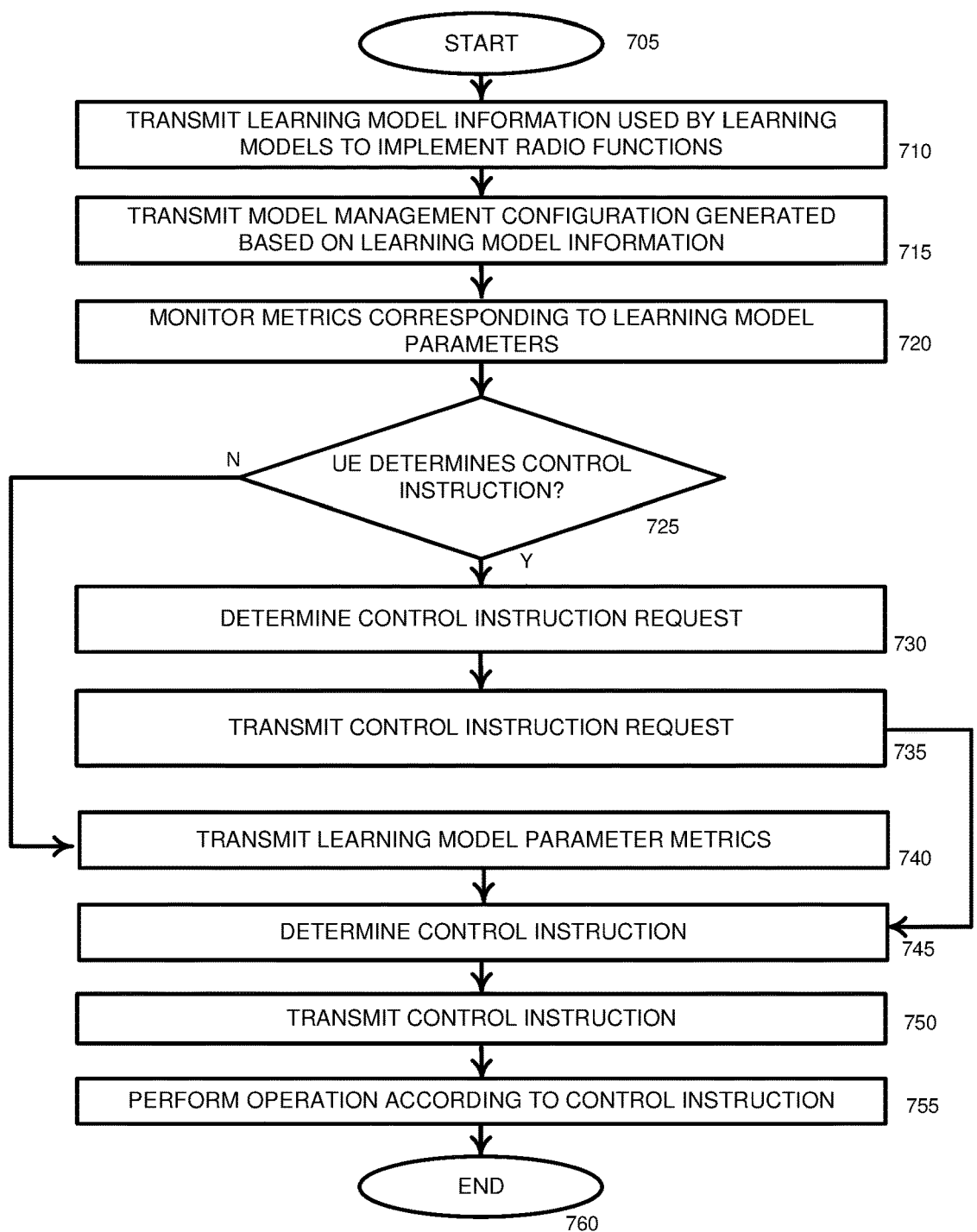
FIG. 7 illustrates a flow diagram of an example method to manage a learning model facilitating a radio function at a user equipment.

Turning now to FIG. 7, the figure illustrates a flow diagram of an embodiment method 700 to manage one or more learning models that may facilitate one or more corresponding radio functions. Method 700 begins at act 705. At act 710, a user equipment transmits, to a RAN node serving the user equipment, information corresponding to one or more learning models used at the user equipment to facilitate one or more respective radio functions. At act 715, after receiving the learning model information that was transmitted at act 710, the RAN generates a learning model management configuration based on the learning model information. At act 720, the user equipment monitors metrics corresponding to learning model parameters. The parameters for which metrics are monitored by the user equipment at act 720 may comprise learning model parameters such as statistical parameters as described in reference to Table 1, not necessarily radio function metrics, examples of which radio function metrics might comprise signal strength, beam identifier, and the like. In an embodiment, the user equipment may not determine a control instruction and instead may transmit to the RAN at act 740 metrics monitored at act 720.

However, the user equipment may determine a control instruction at act 725. The user equipment may determine, based on metrics monitored at act 720, whether the metrics monitored at act 720 satisfy a learning model performance metric criterion. If the monitored metrics meet, or satisfy, the criteria such that, for example, the user equipment can likely determine a recommended control instruction that may remedy unsatisfactory performance by a learning model at the user equipment, then method 700 advances to act 730. At act 730, the user equipment may determine a control instruction request and transmit the control instruction request at act 735 to the RAN. After transmitting the control instruction request at act 735 method 700 advances to act 745.

At act 745, the RAN may determine a control instruction. If act 745 is reached via act 735 the RAN may evaluate the control instruction request transmitted from the user equipment at act 735 and determine whether implementation of the control action would likely alleviate degraded performance of one or more learning models as determined by the user equipment at act 730. For example, the RAN may be aware of, or may have been informed of, network conditions, or other conditions, that may be unrelated to the user equipment, that may have caused a determination, at act 730, by the user equipment that a control instruction would be beneficial to the user equipment, and the RAN may determine that a control instruction requested by the UE would be beneficial and may generate a control instruction for the UE to implement an operation requested in the control operation request transmitted at act 735.

Or the RAN may determine, at act 745, that a control instruction to deny the control instruction of the request transmitted at act 735 should be implemented. In other words, if the RAN, at act 745, determines that the control action request that was generated at act 730 does not need to be implemented because it likely would not improve performance of one or more learning models at the user equipment, the RAN may determine, at act 745, a control instruction to not change operation of the one or more learning models that the user equipment may be implementing.

If act 745 was reached via act 740, then the RAN may determine, at act 745, a control instruction, based on an analysis of the metrics monitored at act 720 and transmitted at 740 with respect to learning model performance criteria.

After determining a control instruction at act 745, method 700 advances to step 750 and transmits the determined control instruction to the user equipment. At act 755, the user equipment may implement the control instruction, which, as described above, may comprise doing nothing. Or the control instruction may comprise an instruction for the user equipment to deactivate one or more learning models corresponding to the metrics monitored at act 720. The control instruction may comprise instructing the user equipment to revert to performing a radio function under the operation of, or facilitated by, a default learning model, or a default deterministic model that does not comprise a learning model.

The RAN may also perform an operation according to the control instruction, for example the RAN may flush, purge, or delete, information, data, or configured values corresponding to one or more learning models at the user equipment for which the control instruction transmitted at act 750 comprises an instruction to delete. Flushing at act 755 may comprise flushing, or deleting, inference assistance signaling procedures for deactivated models according to model identifiers being executed by the UE. After performing operations at act 755, method 700 advances to act 760 and ends.

The control instruction determined at act 745 may comprise an instruction to retrain a learning model for which metrics were monitored at act 720. The instruction to retrain the learning model may comprise a retraining data set, or an index that a user equipment may use to look up a retraining data set in a retraining code book that may have been transmitted from the RAN to the user equipment, for example at act 715. If the control instruction determined at act 745 is for the user equipment to retrain one or more learning models, the user equipment at act 755 performs the retraining of the learning model, or learning models, based on information transmitted, datasets, codebooks, or other data to the by the RAN at act 750. After performing operations at act 755, method 700 advances to act 760 and ends.

Figure 8:
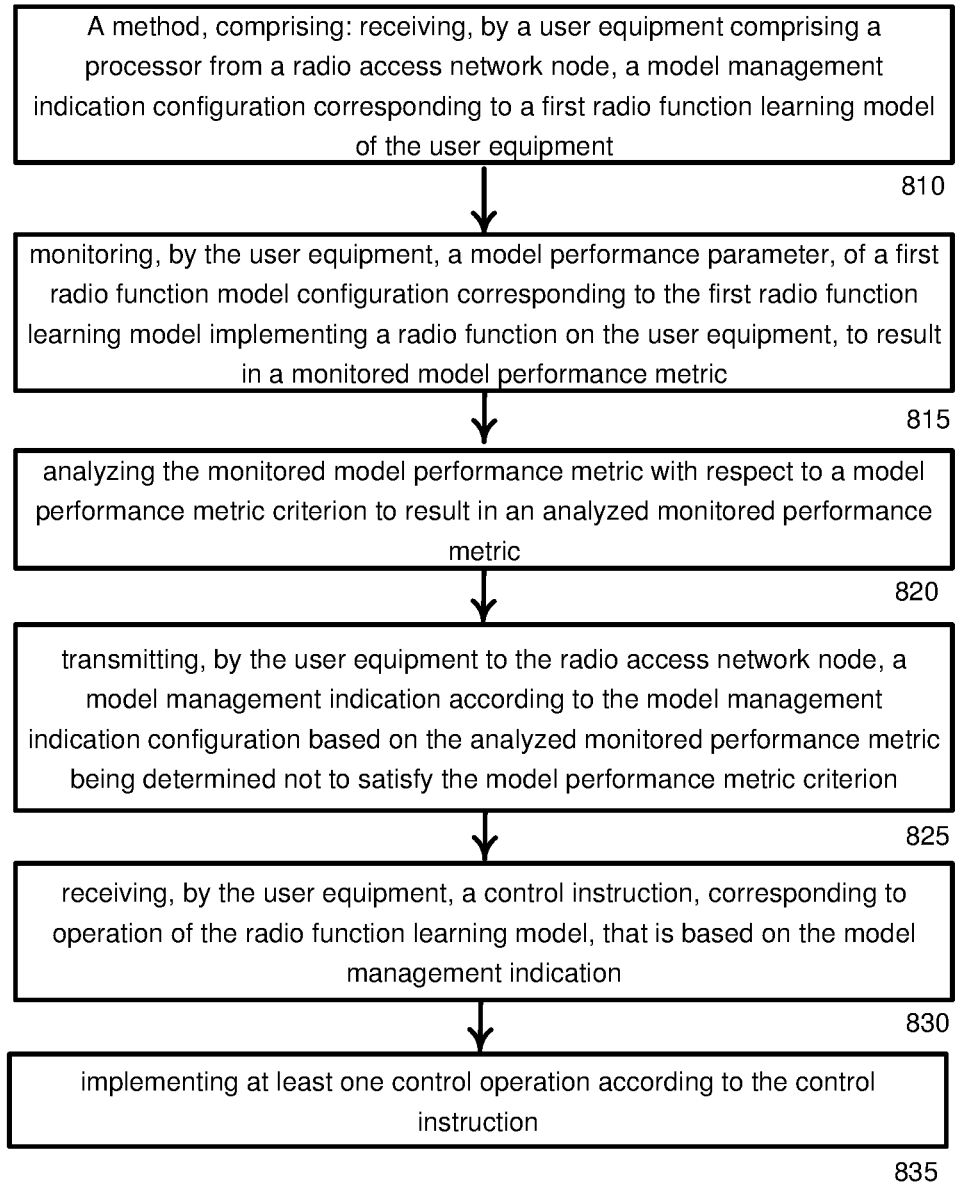
FIG. 8 illustrates a block diagram of an example method.

Turning now to FIG. 8, the figure illustrates an example embodiment method 800 comprising at block 810 receiving, by a user equipment comprising a processor from a radio access network node, a model management indication configuration corresponding to a first radio function learning model of the user equipment; at block 815 monitoring, by the user equipment, a model performance parameter, of a first radio function model configuration corresponding to the first radio function learning model implementing a radio function on the user equipment, to result in a monitored model performance metric; at block 820 analyzing the monitored model performance metric with respect to a model performance metric criterion to result in an analyzed monitored performance metric; at block 825 transmitting, by the user equipment to the radio access network node, a model management indication according to the model management indication configuration based on the analyzed monitored performance metric being determined not to satisfy the model performance metric criterion; at block 830 receiving, by the user equipment, a control instruction, corresponding to operation of the radio function learning model, that is based on the model management indication; and at block 835 implementing at least one control operation according to the control instruction.

Figure 9:
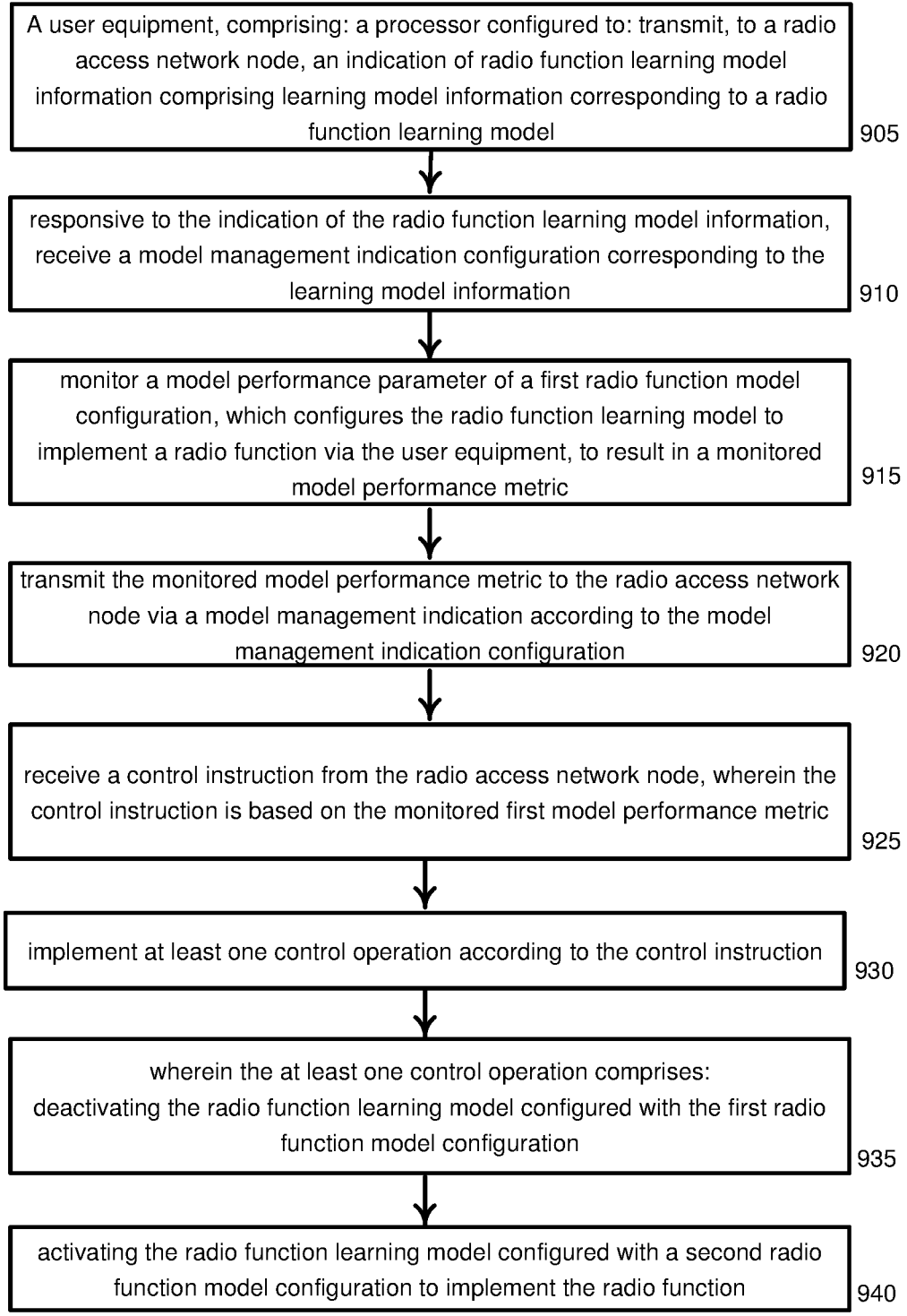
FIG. 9 illustrates a block diagram of an example user equipment.

Turning now to FIG. 9, the figure illustrates a user equipment 900, comprising at block 905 a processor configured to: transmit, to a radio access network node, an indication of radio function learning model information comprising learning model information corresponding to a radio function learning model; at block 910 responsive to the indication of the radio function learning model information, receive a model management indication configuration corresponding to the learning model information; at block 915 monitor a model performance parameter of a first radio function model configuration, which configures the radio function learning model to implement a radio function via the user equipment, to result in a monitored model performance metric; at block 920 transmit the monitored model performance metric to the radio access network node via a model management indication according to the model management indication configuration; at block 925 receive a control instruction from the radio access network node, wherein the control instruction is based on the monitored first model performance metric; at block 930 implement at least one control operation according to the control instruction; at block 935 wherein the at least one control operation comprises: deactivating the radio function learning model configured with the first radio function model configuration; and at block 940 activating the radio function learning model configured with a second radio function model configuration to implement the radio function.

Figure 10:
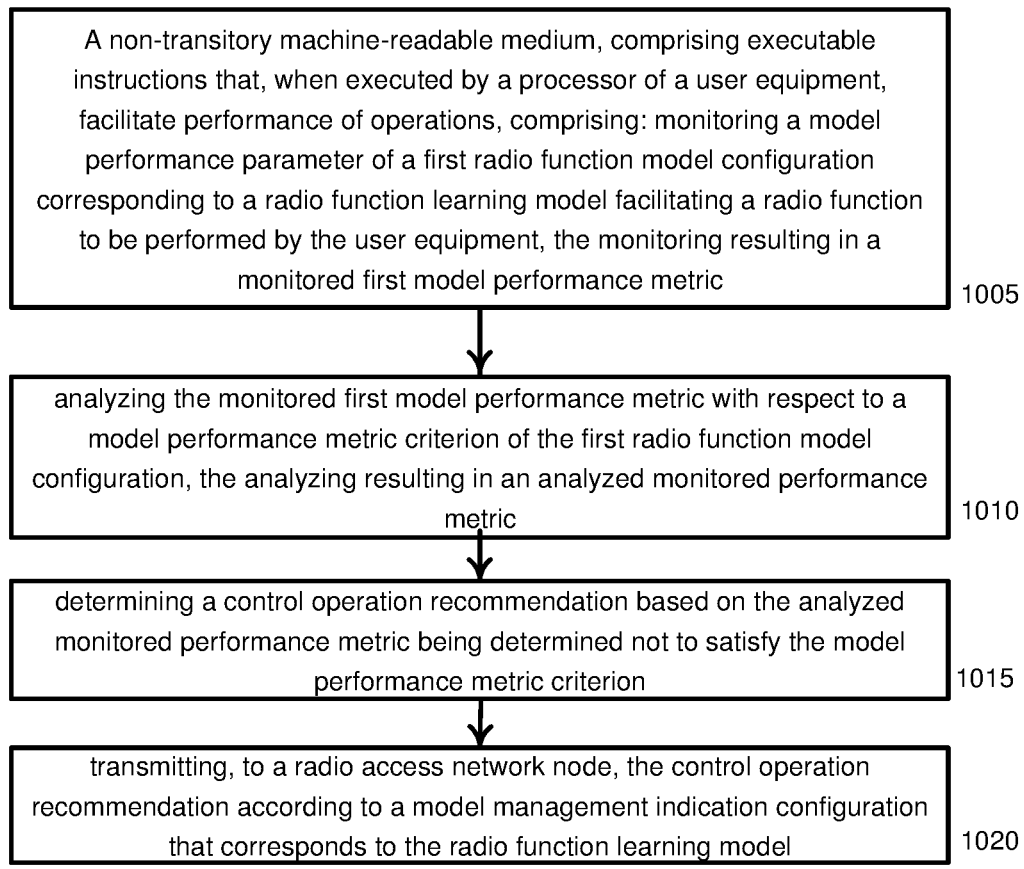
FIG. 10 illustrates a block diagram of an example non-transitory machine-readable medium.

Turning now to FIG. 10, the figure illustrates a non-transitory machine-readable medium 1000 comprising at block 1005 executable instructions that, when executed by a processor of a user equipment, facilitate performance of operations, comprising: monitoring a model performance parameter of a first radio function model configuration corresponding to a radio function learning model facilitating a radio function to be performed by the user equipment, the monitoring resulting in a monitored first model performance metric; at block 1010 analyzing the monitored first model performance metric with respect to a model performance metric criterion of the first radio function model configuration, the analyzing resulting in an analyzed monitored performance metric; at block 1015 determining a control operation recommendation based on the analyzed monitored performance metric being determined not to satisfy the model performance metric criterion; and at block 1020 transmitting, to a radio access network node, the control operation recommendation according to a model management indication configuration that corresponds to the radio function learning model.

Figure 11:
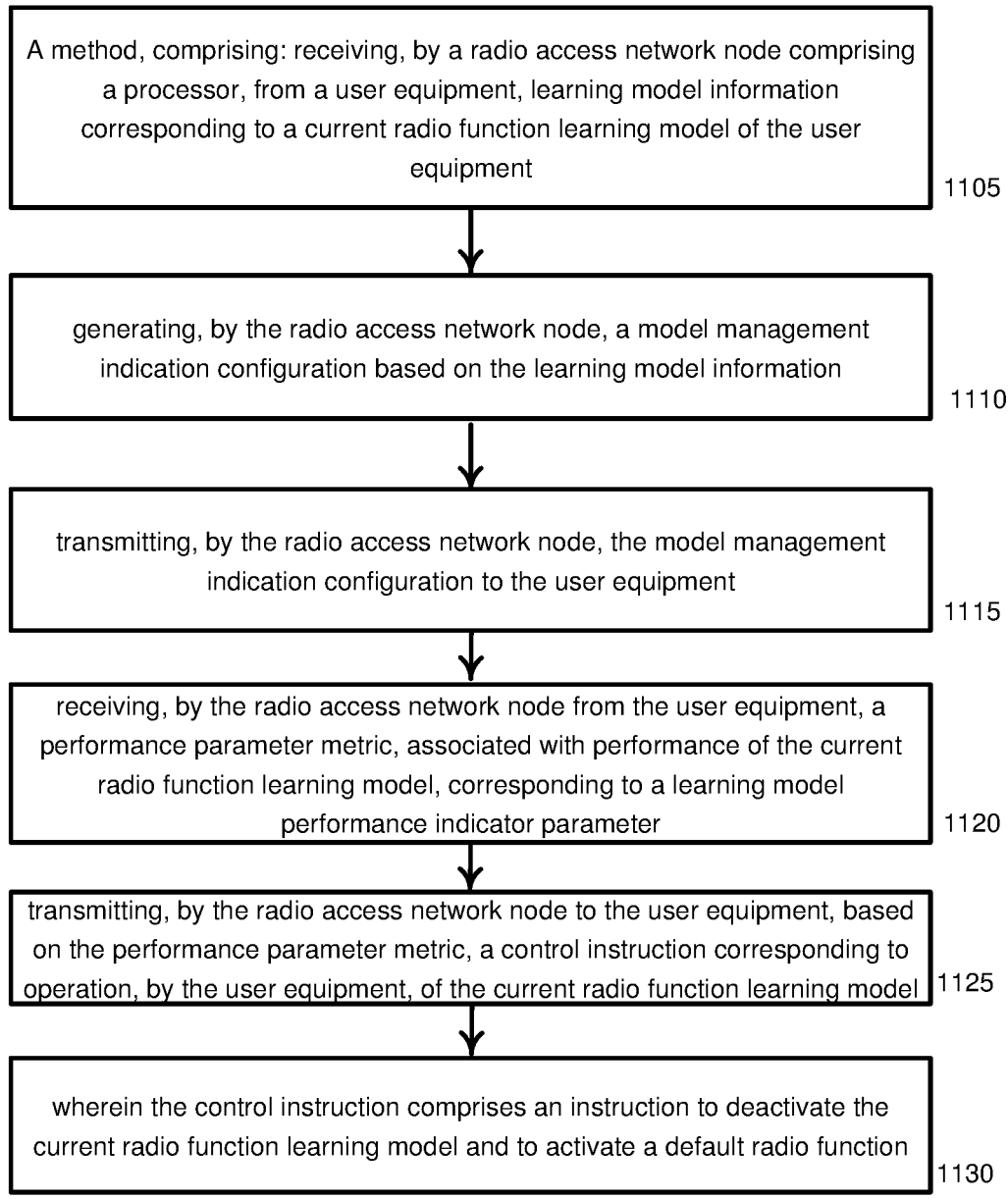
FIG. 11 illustrates a block diagram of an example method.

Turning now to FIG. 11, the figure illustrates an example embodiment method 1100 comprising at block 1105, receiving, by a radio access network node comprising a processor, from a user equipment, learning model information corresponding to a current radio function learning model of the user equipment; at block 1110 generating, by the radio access network node, a model management indication configuration based on the learning model information; at block 1115 transmitting, by the radio access network node, the model management indication configuration to the user equipment; at block 1120 receiving, by the radio access network node from the user equipment, a performance parameter metric, associated with performance of the current radio function learning model, corresponding to a learning model performance indicator parameter; at block 1125 transmitting, by the radio access network node to the user equipment, based on the performance parameter metric, a control instruction corresponding to operation, by the user equipment, of the current radio function learning model; and at block 1130 wherein the control instruction comprises an instruction to deactivate the current radio function learning model and to activate a default radio function.

Figure 12:
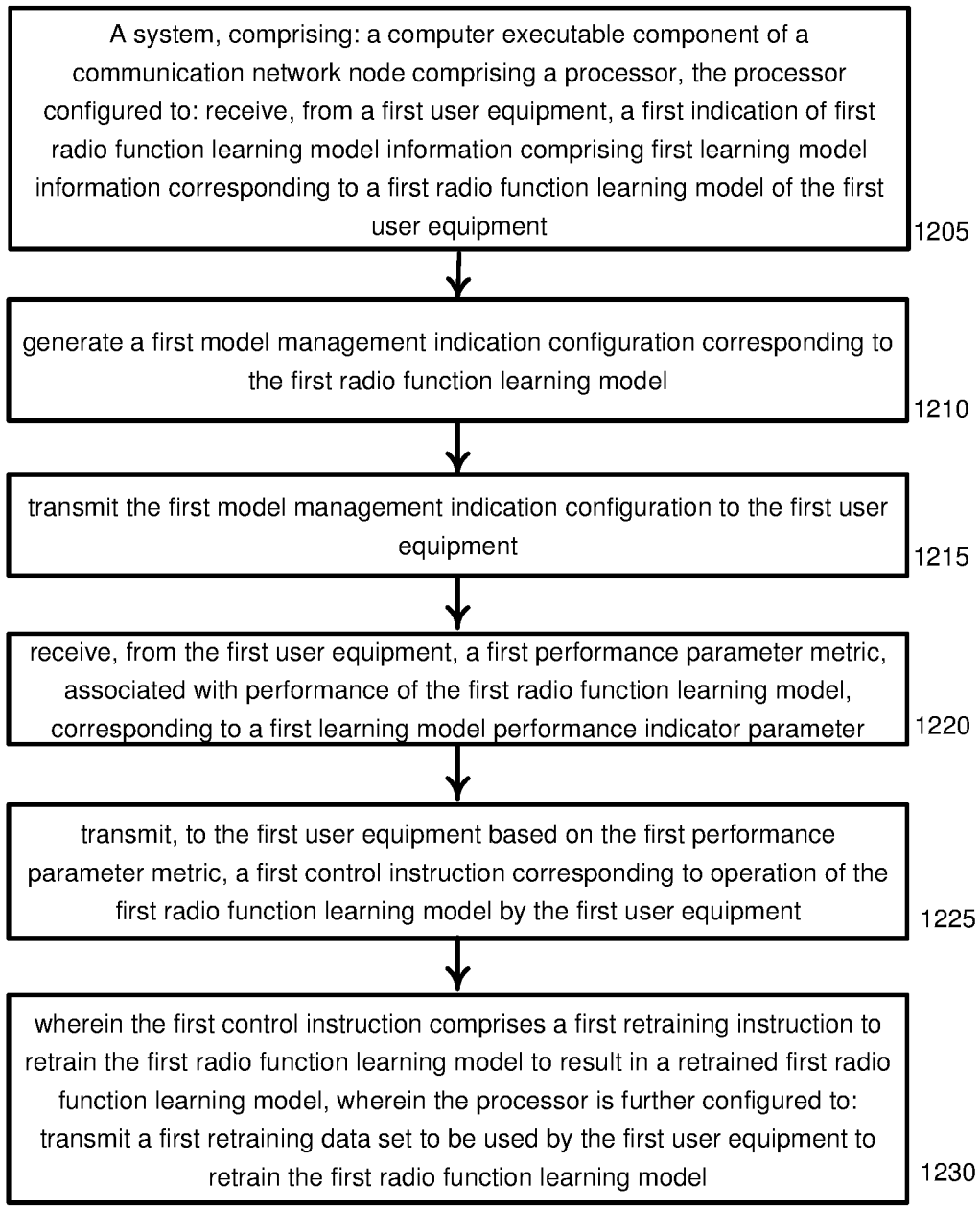
FIG. 12 illustrates a block diagram of an example user equipment.

Turning now to FIG. 12, the figure illustrates an example system 1200, comprising at block 1205 a computer executable component of a communication network node comprising a processor, the processor configured to: receive, from a first user equipment, a first indication of first radio function learning model information comprising first learning model information corresponding to a first radio function learning model of the first user equipment; at block 1210 generate a first model management indication configuration corresponding to the first radio function learning model; at block 1215 transmit the first model management indication configuration to the first user equipment; at block 1220 receive, from the first user equipment, a first performance parameter metric, associated with performance of the first radio function learning model, corresponding to a first learning model performance indicator parameter; at block 1225 transmit, to the first user equipment based on the first performance parameter metric, a first control instruction corresponding to operation of the first radio function learning model by the first user equipment; and at block 1230 wherein the first control instruction comprises a first retraining instruction to retrain the first radio function learning model to result in a retrained first radio function learning model, wherein the processor is further configured to: transmit a first retraining data set to be used by the first user equipment to retrain the first radio function learning model.

Figure 13:
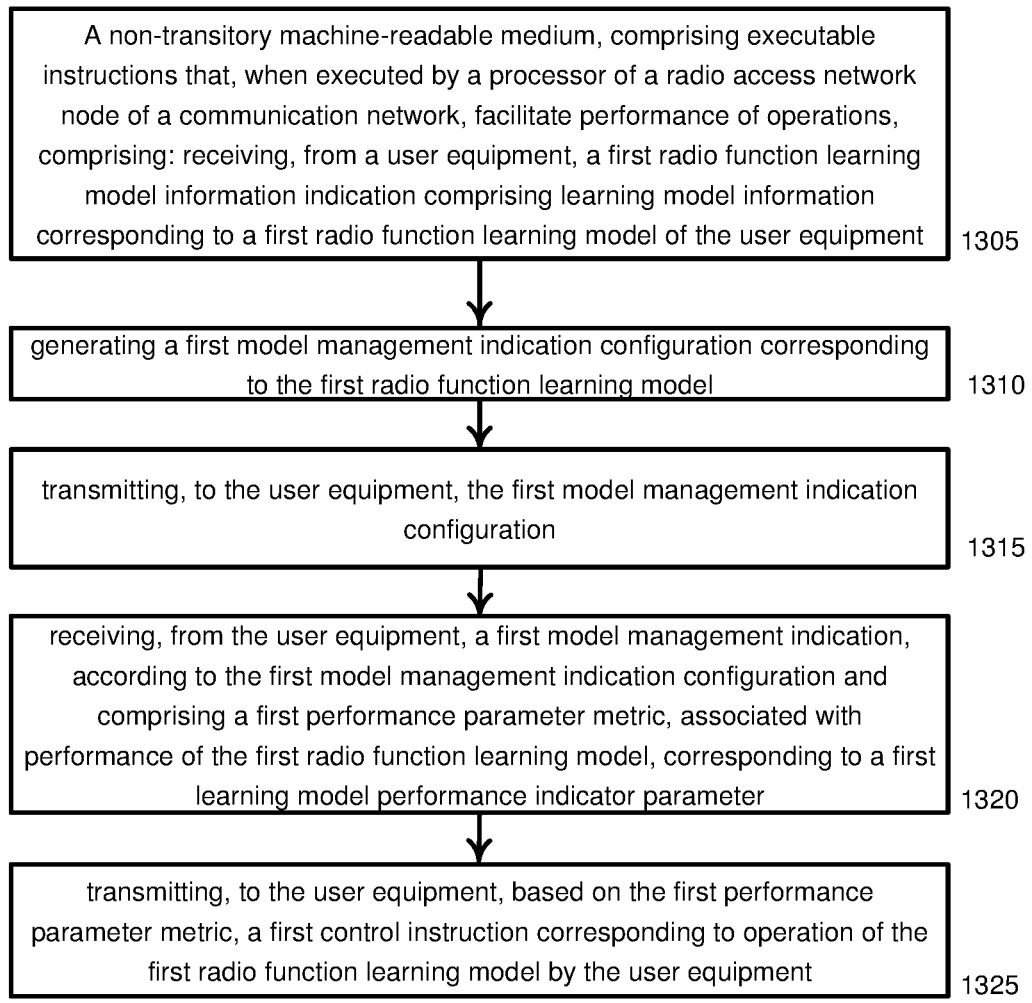
FIG. 13 illustrates a block diagram of an example non-transitory machine-readable medium.

Turning now to FIG. 13, the figure illustrates a non-transitory machine-readable medium 1300 comprising at block 1305 executable instructions that, when executed by a processor of a radio access network node of a communication network, facilitate performance of operations, comprising: receiving, from a user equipment, a first radio function learning model information indication comprising learning model information corresponding to a first radio function learning model of the user equipment; at block 1310 generating a first model management indication configuration corresponding to the first radio function learning model; at block 1315 transmitting, to the user equipment, the first model management indication configuration; at block 1320 receiving, from the user equipment, a first model management indication, according to the first model management indication configuration and comprising a first performance parameter metric, associated with performance of the first radio function learning model, corresponding to a first learning model performance indicator parameter; and at block 1325 transmitting, to the user equipment, based on the first performance parameter metric, a first control instruction corresponding to operation of the first radio function learning model by the user equipment.

Figure 14:
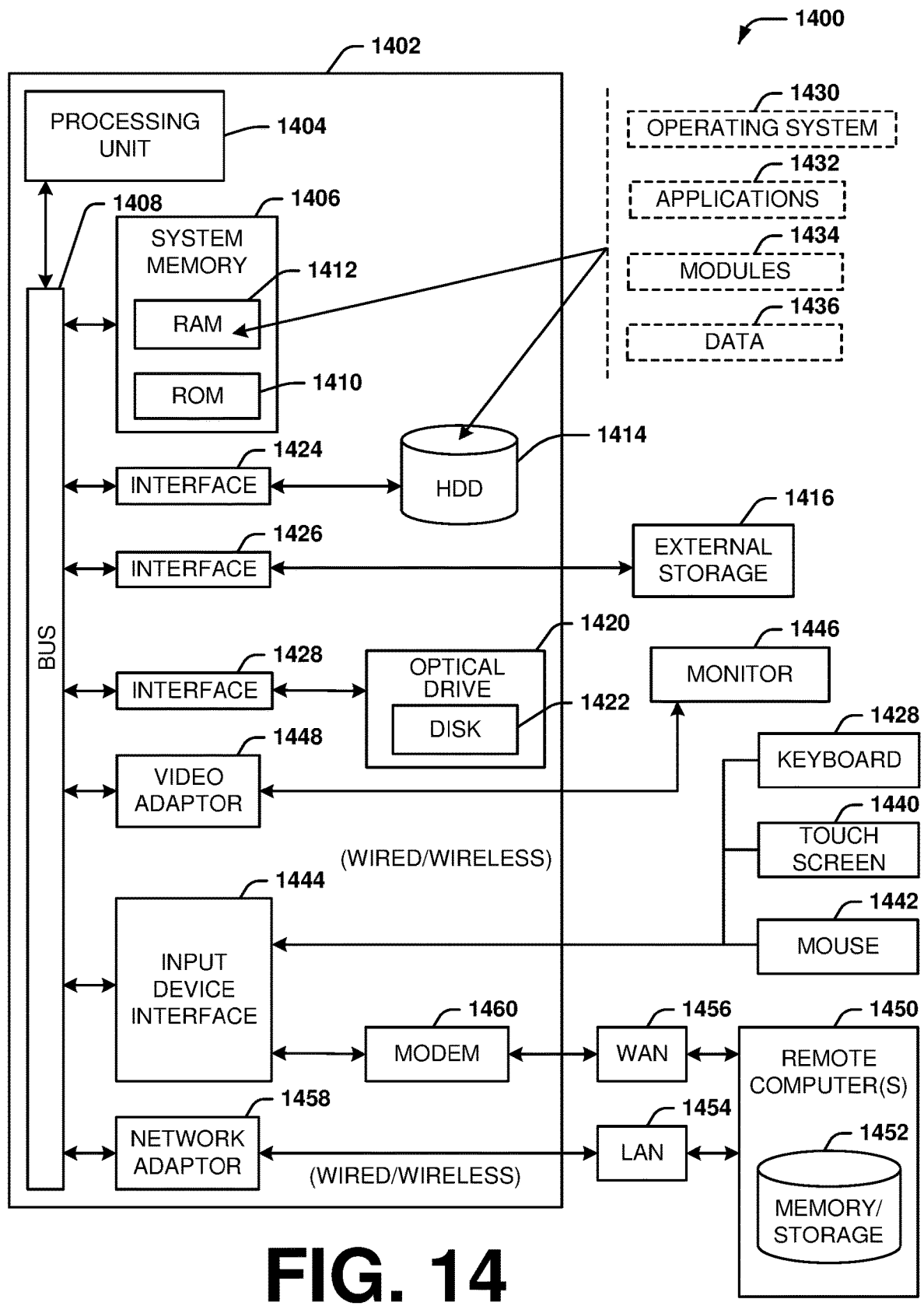
FIG. 14 illustrates an example computer environment.

In order to provide additional context for various embodiments described herein, FIG. 14 and the following discussion are intended to provide a brief, general description of a suitable computing environment 1400 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors and may include a cache memory. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

Computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can comprise a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
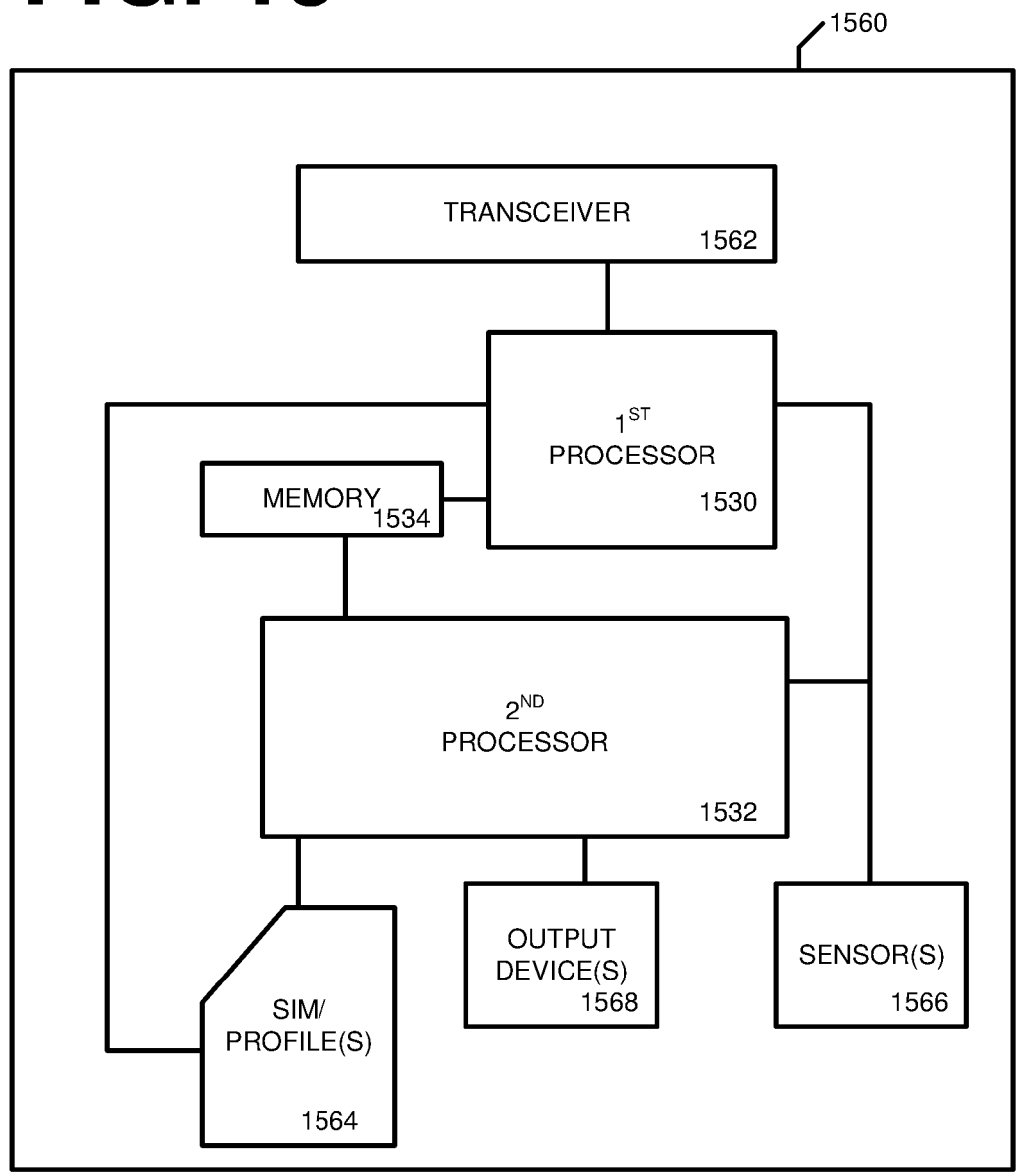
FIG. 15 illustrates a block diagram of an example wireless UE.

Turning to FIG. 15, the figure illustrates a block diagram of an example UE 1560. UE 1560 may comprise a smart phone, a wireless tablet, a laptop computer with wireless capability, a wearable device, a machine device that may facilitate vehicle telematics, a tracking device, remote sensing devices, and the like. UE 1560 comprises a first processor 1530, a second processor 1532, and a shared memory 1534. UE 1560 includes radio front end circuitry 1562, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1562 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 15, UE 1560 may also include a SIM 1564, or a SIM profile, which may comprise information stored in a memory (memory 34 or a separate memory portion), for facilitating wireless communication with RAN 105 or core network 130 shown in FIG. 1. FIG. 15 shows SIM 1564 as a single component in the shape of a conventional SIM card, but it will be appreciated that SIM 1564 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1564 and another device, which may be a component of RAN 105 or core network 130 shown in FIG. 1). A SIM profile 1564 may also comprise identifying information that is unique to the SIM, or SIM profile, such as, for example, an International Mobile Subscriber Identity ("IMSI") or information that may make up an IMSI.

SIM 1564 is shown coupled to both the first processor portion 1530 and the second processor portion 1532. Such an implementation may provide an advantage that first processor portion 1530 may not need to request or receive information or data from SIM 1564 that second processor 1532 may request, thus eliminating the use of the first processor acting as a 'go-between' when the second processor uses information from the SIM in performing its functions and in executing applications. First processor 1530, which may be a modem processor or a baseband processor, is shown smaller than processor 1532, which may be a more sophisticated application processor, to visually indicate the relative levels of sophistication (i.e., processing capability and performance) and corresponding relative levels of operating power consumption levels between the two processor portions. Keeping the second processor portion 1532 asleep/inactive/in a low power state when UE 1560 does not need it for executing applications and processing data related to an application provides an advantage of reducing power consumption when the UE only needs to use the first processor portion 1530 while in listening mode for monitoring routine configured bearer management and mobility management/maintenance procedures, or for monitoring search spaces that the UE has been configured to monitor while the second processor portion remains inactive/asleep.

UE 1560 may also include sensors 1566, such as, for example, temperature sensors, accelerometers, gyroscopes, barometers, moisture sensors, and the like that may provide signals to the first processor 1530 or second processor 1532. Output devices 1568 may comprise, for example, one or more visual displays (e.g., computer monitors, VR appliances, and the like), acoustic transducers, such as speakers or microphones, vibration components, and the like. Output devices 1568 may comprise software that interfaces with output devices, for example, visual displays, speakers, microphones, touch sensation devices, smell or taste devices, and the like, that are external to UE 1560.

The following glossary of terms given in Table 2 may apply to one or more descriptions of embodiments disclosed herein.

TABLE 2

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| AI | Artificial intelligence |
| ML | Machine learning |
| QCI | QoS Class Identifiers |
| BSR | Buffer status report |
| SBFD | Sub-band full duplex |

TABLE 2-continued

| Term | Definition |
|---|---|
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has." "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment comprising at least one processor from a radio access network node, a model management indication configuration corresponding to a first radio function learning model of the user equipment;

monitoring, by the user equipment, a model performance parameter, of a first radio function model configuration corresponding to the first radio function learning model implementing a radio function on the user equipment, to result in a monitored model performance metric;

analyzing the monitored model performance metric with respect to a model performance metric criterion to result in an analyzed monitored performance metric;

transmitting, by the user equipment to the radio access network node, a model management indication according to the model management indication configuration based on the analyzed monitored performance metric being determined not to satisfy the model performance metric criterion;

receiving, by the user equipment, a control instruction, corresponding to operation of the radio function learning model, that is based on the model management indication; and implementing at least one control operation according to the control instruction, wherein the at least one control operation comprises deactivating the first radio function learning model and activating a configured default radio function to perform the radio function, and wherein the at least one control operation is determined by the radio access network node.

2. The method of claim 1, wherein the first radio function model configuration comprises at least one configured radio function model parameter value, and wherein the at least one control operation comprises retraining the first radio function learning model using the at least one configured radio function model parameter value to result in a retrained first radio function learning model.

3. The method of claim 1, wherein the first radio function model configuration comprises at least one configured radio function model parameter value, the method further comprising:

receiving an updated first radio function model configuration comprising at least one configured updated radio function model parameter value;
replacing the at least one configured radio function model parameter value with the at least one configured updated radio function model parameter value; and
implementing the radio function with the first radio function learning model using the at least one configured updated radio function model parameter value.

4. The method of claim 1, wherein the model management indication comprises a control operation request that requests an updated first radio function model configuration, the method further comprising:
receiving, from the radio access network node responsive to the model management indication, the updated first radio function model configuration;
responsive to receiving the updated first radio function model configuration, deactivating use of the first radio function learning model according to the first radio function model configuration; and
activating the use of the first radio function learning model according to the updated first radio function model configuration.

5. The method of claim 1, wherein the at least one control operation comprises retraining the first radio function learning model using at least one configured radio function model parameter value to result in a retrained first radio function learning model.

6. The method of claim 1, wherein the model performance parameter comprises at least one of: a mean squared error value, a root mean squared error value, a normalized mean squared error value, a mean absolute error value, an R-squared value, a generalized cosine similarity value, a squared generalized cosine similarity value, an accuracy value, a number of true negatives value, a number of true positives value, a number of false negatives value, a number of false positives value, a precision value, a recall value, or an F1 score value.

7. The method of claim 1, further comprising: transmitting, by the user equipment to the radio access network node, an indication of radio function learning model information comprising learning model information corresponding to the first radio function learning model;
wherein the indication of the radio function learning model information is a first indication, wherein the learning model information comprises at least one of: at least one learning model type indication, at least one radio function indication indicating at least one corresponding radio function, a list of at least one metric parameter corresponding to at least one learning model, corresponding to the at least one learning model type indication, to be estimated or reported, a value representing a number of learning models that the user equipment stored for implementation of the at least one corresponding radio function, or a second indication of at least one learning model category corresponding to at least one dataset to be used by the radio access network node to determine the analyzed monitored performance metric.

8. The method of claim 1, wherein the first radio function learning model is selected from different radio function learning models capable of implementing the radio function.

9. The method of claim 8, wherein the control instruction comprises an instruction to deactivate use of the first radio function learning model, wherein the control instruction comprises an instruction to activate a second radio function learning model, of the different radio function learning models, to implement the radio function, wherein the first radio function model configuration defines the first radio function learning model and a second radio function model configuration defines the second radio function learning model, and wherein the first radio function model configuration is different from the second radio function model configuration.

10. The method of claim 1, wherein the model management indication configuration is based on at least one learning model capability corresponding to the user equipment.

11. A user equipment, comprising:
at least one processor configured to:
transmit, to a radio access network node, an indication of radio function learning model information comprising learning model information corresponding to a radio function learning model;
responsive to the indication of the radio function learning model information, receive a model management indication configuration corresponding to the learning model information;
monitor a model performance parameter of a first radio function model configuration, which configures the radio function learning model to implement a radio function via the user equipment, to result in a monitored model performance metric;
transmit the monitored model performance metric to the radio access network node via a model management indication according to the model management indication configuration;
receive a control instruction from the radio access network node, wherein the control instruction is based on the monitored first model performance metric;
implement at least one control operation according to the control instruction;
receive an updated radio function model configuration; and
implement the radio function with the radio function learning model using the updated radio function model configuration.

12. The user equipment of claim 11, the at least one processor further configured to:
receive a training radio function model configuration,
wherein the at least one control operation comprises retraining the radio function learning model using the training radio function model configuration.

13. The user equipment of claim 11, wherein the at least one control operation comprises:
deactivating the radio function learning model configured with the first radio function model configuration; and
activating the radio function learning model configured with a second radio function model configuration to implement the radio function.

14. The user equipment of claim 11, wherein the model performance parameter comprises a mathematical function.

15. The user equipment of claim 11, wherein the indication of radio function learning model information is indicative of at least one learning model capability corresponding to the user equipment.

16. A non-transitory machine-readable medium, comprising executable instructions that, when executed by at least one processor of a user equipment, facilitate performance of operations, comprising:
monitoring a model performance parameter of a first radio function model configuration corresponding to a radio function learning model facilitating a radio function to be performed by the user equipment, the monitoring resulting in a monitored first model performance metric;

analyzing the monitored first model performance metric with respect to a model performance metric criterion of the first radio function model configuration, the analyzing resulting in an analyzed monitored performance metric;

determining a control operation recommendation based on the analyzed monitored performance metric being determined not to satisfy the model performance metric criterion;

transmitting, to a radio access network node, the control operation recommendation according to a model management indication configuration that corresponds to the radio function learning model;

responsive to transmitting the control operation recommendation, receiving a control instruction comprising at least one control operation; and implementing the at least one control operation according to the control instruction, wherein the control instruction is determined by the radio access network node based on the control operation recommendation.

17. The non-transitory machine-readable medium of claim 16, wherein the control operation recommendation comprises recommending deactivation of use of the first radio function model configuration to facilitate the radio function and activation of a second radio function model configuration, and wherein the user equipment is configured according to the first radio function model configuration and the second radio function model configuration.

18. The non-transitory machine-readable medium of claim 17, wherein the operations further comprise:

transmitting, to the radio access network node, a radio function learning model information indication comprising learning model information corresponding to the radio function learning model;

responsive to the learning model information, receiving the first radio function model configuration and a model management indication configuration;

generating the control operation recommendation according to the model management indication configuration; and scheduling the transmitting of the control operation recommendation via an uplink data channel corresponding to the user equipment.

19. The non-transitory machine-readable medium of claim 18, wherein the model management indication configuration comprises at least one of: at least one model identifier corresponding to the radio function learning model, at least one learning model filter type, at least one quantization configuration corresponding to the model performance parameter, the model performance metric criterion, or one or more performance metrics to be monitored over a configured monitoring period.

20. The non-transitory machine-readable medium of claim 16, wherein the model management indication configuration is based on at least one learning model capability corresponding to the user equipment.

* * * * *